(12) United States Patent
Garbelli

(10) Patent No.: US 12,054,015 B2
(45) Date of Patent: Aug. 6, 2024

(54) METHOD AND SYSTEM FOR MONITORING A PARAMETER RELATED TO A TIRE DURING THE RUNNING OF A VEHICLE

(71) Applicant: Pirelli Tyre S.p.A., Milan (IT)

(72) Inventor: Daniele Garbelli, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 359 days.

(21) Appl. No.: 16/764,750

(22) PCT Filed: Nov. 22, 2018

(86) PCT No.: PCT/EP2018/082197
§ 371 (c)(1),
(2) Date: May 15, 2020

(87) PCT Pub. No.: WO2019/101849
PCT Pub. Date: May 31, 2019

(65) Prior Publication Data
US 2021/0178841 A1      Jun. 17, 2021

(30) Foreign Application Priority Data

Nov. 24, 2017   (EP) .................................... 17203640

(51) Int. Cl.
*B60C 23/06*    (2006.01)
*B60C 23/04*    (2006.01)
*B60R 16/023*   (2006.01)

(52) U.S. Cl.
CPC ........ *B60C 23/064* (2013.01); *B60C 23/0488* (2013.01); *B60R 16/0232* (2013.01)

(58) Field of Classification Search
None
See application file for complete search history.

(56) References Cited

U.S. PATENT DOCUMENTS

2005/0097949 A1*  5/2005  Hillenmayer ......... B60T 8/1725
                                                                    73/146
2007/0010928 A1   1/2007  Brusarosco et al.
(Continued)

FOREIGN PATENT DOCUMENTS

CH      17157858    *  2/2017   ......... B60C 23/0488
EP      1202867 A1     5/2002
(Continued)

OTHER PUBLICATIONS

Google Patents English Translation of JP6907965B2, Takasuka et al. (filed Feb. 1, 2018) (Year: 2018).*
(Continued)

*Primary Examiner* — Thomas E Worden
(74) *Attorney, Agent, or Firm* — Finnegan, Henderson, Farabow, Garrett & Dunner, L.L.P.

(57) ABSTRACT

A monitoring of a tire is performed by using a monitoring unit operated at low frequency and with low power needs, without the need of providing complex hardware and software adapted for reconstructing a signal descriptive of the tire deformations and/or for recognizing the start and the end of peaks or valleys or other significant points of such signal. The monitoring uses a statistical approach for the estimation of the length of the contact area, or of other parameters related to it, based on an estimation of a probability of finding the monitoring unit in correspondence of the contact area at a certain time during rolling.

17 Claims, 11 Drawing Sheets

(56) References Cited

U.S. PATENT DOCUMENTS

| | | | |
|---|---|---|---|
| 2007/0171034 A1* | 7/2007 | Mancosu | B60C 23/0408 703/8 |
| 2007/0240501 A1* | 10/2007 | Mancosu | B60C 23/0408 73/146 |
| 2010/0131208 A1* | 5/2010 | Mancosu | B60T 8/1725 73/146 |
| 2011/0231113 A1 | 9/2011 | Brusarosco et al. | |
| 2013/0211741 A1 | 8/2013 | Tebano et al. | |
| 2014/0007683 A1* | 1/2014 | Guinart | B60C 23/064 73/514.02 |
| 2018/0244116 A1* | 8/2018 | Zhuk | B60C 23/0416 |
| 2018/0290043 A1* | 10/2018 | Guillemette | G01P 1/127 |
| 2019/0118591 A1* | 4/2019 | Kollmitzer | B60C 23/061 |
| 2020/0025605 A1* | 1/2020 | Lemineur | B60C 23/0488 |
| 2020/0208969 A1* | 7/2020 | Suzuki | B60C 23/0408 |
| 2020/0276870 A1* | 9/2020 | Begou | B60T 8/1725 |
| 2020/0346655 A1* | 11/2020 | Suzuki | B60T 8/1725 |
| 2020/0348167 A1* | 11/2020 | Takasuka | B60W 40/06 |

FOREIGN PATENT DOCUMENTS

| | | | |
|---|---|---|---|
| EP | 1449684 A2 | 8/2004 | |
| EP | 1487681 A1 | 12/2004 | |
| EP | 1572474 A1 | 9/2005 | |
| EP | 1642108 A1 | 4/2006 | |
| EP | 1675735 A1 | 7/2006 | |
| EP | 1676112 A1 | 7/2006 | |
| EP | 1678019 A1 | 7/2006 | |
| EP | 1794007 A1 | 6/2007 | |
| EP | 2346725 A1 | 7/2011 | |
| EP | 2352653 A1 | 8/2011 | |
| JP | 6907965 B2 * | 7/2021 | ............ B60C 19/00 |
| WO | WO 0108908 A1 | 2/2001 | |
| WO | WO 03/082644 A1 | 10/2003 | |
| WO | WO 2004/056591 | 7/2004 | |
| WO | WO 2005/005950 A1 | 1/2005 | |
| WO | WO 2005005950 A1 | 1/2005 | |
| WO | WO 2005/042281 A1 | 5/2005 | |
| WO | WO 2005/043106 A1 | 5/2005 | |
| WO | WO 2006/034731 A1 | 4/2006 | |
| WO | WO 2005/042322 A1 | 5/2006 | |
| WO | WO 2008/065465 A1 | 6/2008 | |
| WO | WO 2010/046871 A1 | 4/2010 | |
| WO | WO 2010/046872 A1 | 4/2010 | |
| WO | WO 2012042369 A1 | 4/2012 | |
| WO | WO-2012042369 A1 * | 4/2012 | ............ B60T 8/172 |

OTHER PUBLICATIONS

International Search Report form the European Patent Office in corresponding International Application No. PCT/EP2018/082197 mailed Feb. 5, 2019.

Written Opinion of the International Searching Authority from the European Patent Office in corresponding International Application No. PCT/EP2018/082197 mailed Feb. 5, 2019.

\* cited by examiner

METHOD AND SYSTEM FOR MONITORING A PARAMETER RELATED TO A TIRE DURING THE RUNNING OF A VEHICLE

This application is a national phase application under 35 U.S.C. § 371 based on International Application No. PCT/EP2018/082197, filed Nov. 22, 2018, and claims priority of European Patent Application No. 17203640.2, filed Nov. 24, 2017; the contents of each application is incorporated herein by reference.

FIELD OF THE INVENTION

The present invention relates to a method and system for monitoring a parameter related to a tire during the running of a vehicle. The present invention also relates to a method and system for controlling a vehicle. The present invention also concerns a monitoring unit to be associated with tires. The present invention also concerns a tire comprising a monitoring unit. The present invention also relates to a vehicle comprising a system for controlling said vehicle.

BACKGROUND ART

For some types of tires, especially those that require a high level of performance, monitoring units have been studied for some time which, when placed within said tires, will have the task of detecting tire's characteristic values, so as to allow substantially real-time monitoring and control of the operation and conditions of the tire.

These monitoring units will periodically dialogue with the devices on board the vehicle, so that all the detected information can be provided to the driver and/or vehicle control systems, to, for example, activate or adjust to the best alarm systems and/or vehicle dynamics control, braking, etc. Tire related information may be used within the vehicle or it can be used remotely, i.e. transmitted outside the vehicle or to the driver, e.g. to one or more personal devices and/or remote servers.

The monitoring units for tires typically comprise an electronic unit and a securing device.

The electronic unit comprises at least one sensor (for example a temperature sensor, a pressure sensor, a sensor able to measure/identify the tire's deformations during rolling, such as, for example, an accelerometer, a strain gauge, a piezoelectric sensor etc.) and a transmission system for sending the data detected by said at least one sensor to a receiving unit located on the vehicle. The electronic unit typically comprises a processing unit.

The securing device has the task of keeping the electronic unit fixed to the tire. In particular, in order to identify and measure the tire's deformations and estimate from said deformations certain parameters (for example the length of the footprint or contact area, the load acting on the tire, the angular velocity, the friction between the tire and the rolling surface, the wear of the tire, etc.) it may be convenient to fix one or more monitoring devices to the inner surface of the tire, for example on the tire's inner surface opposite to the tread or in general to a crown portion of a tire.

Other more basic tire monitoring systems only determine tire pressure and temperature.

The following documents describe tire monitoring systems and related monitoring methods: EP1202867 A1, EP1449684 A1, EP1572474 A1, EP1487681 A1, EP1642108 A1, EP1676112 A1, EP1675735 A1, EP1678019 A1, EP1794007 A1, WO2008/065465 A1, EP2346725 A1, EP2352653 A1.

SUMMARY OF THE INVENTION

The Applicant has faced the problem of monitoring tires fitted to a vehicle during use of the vehicle.

Among tire's parameters to be monitored during tire rolling, the length of the contact area between the tire and the rolling surface is one of the most challenging to be estimated since, as described above, it requires monitoring units with a sophisticated hardware comprising a sensor able to detect the tire's deformations during rolling, such as for example a sensor being able to measure radial acceleration or other physical quantity descriptive of the tire deformation during rolling. The length of the contact area can also be ultimately related to other parameters related to tires, such as for example the load exerted on the tire by the vehicle.

The sensor able to detect the tire's deformations is generally operated at high sampling frequency in order to properly reconstruct the profile (e.g. the acceleration profile) descriptive of the tire deformation over time. From such measured profile, the length of the contact area can be identified (e.g. by measuring the width of relevant peaks and/or valleys in the profile), and its length can be estimated.

When real time monitoring is carried out at typical running speed or at high speed, it has to be taken into account that the monitoring unit is caused to pass in correspondence of the tire contact area many times per second. For example at 50 km/h a tire rotates at about 7 turns/s, i.e. seven tire round trips per second.

Furthermore, on average the length of the contact area represents only a small portion, 3% to 15%, of the tire circumference, so that the monitoring unit remains in correspondence of the tire contact area for a very small amount of time over a round trip. Moreover entering and exiting from the contact area is a very abrupt process generating sharp variations in the signal sensed by the sensor, further increasing the need of a very high sampling frequency in order to precisely identify the start and the end of the portion of the measured profile corresponding to the contact area.

Reference is for example made to FIG. 1 wherein radial acceleration is plotted versus time for three consecutive tire round trips for a tire fitted on a vehicle traveling at a speed of 80 km/h, comprising an accelerometer secured to a crown portion of the tire, on the tire inner liner. A sampling frequency of 5 kHz is necessary to properly resolve the three sharp peaks corresponding to the respective passages of the monitoring unit in correspondence of the contact area.

In FIG. 2 a magnification of FIG. 1 around one of such three peaks is plotted. More than twenty sampling points, i.e. radial acceleration measurements, are used to reconstruct the central peak of the acceleration profile, i.e. the portion of the acceleration profile corresponding to the approaching of the monitoring unit to the contact area, its entering and remaining in correspondence of said contact area, and finally its exiting from the contact area. The direct measurement of the length of the contact area is carried out, for example, based on the estimation of the width of such peak.

This leads to the use of sophisticated and expensive monitoring units comprising sensors and related electronic control units which are driven and operated at very high sampling frequency, i.e. at a sampling frequency high enough to properly reconstruct the signal generated by the sensor.

The use of high sampling frequency operated sensors implies high power needs and consumption. Moreover, it also creates the need of transmitting a huge amount of data generated during sampling to an external control unit. Alternatively, the raw sensed data can be filtered and processed within the monitoring unit itself. In both cases power consumption and hardware complexity are further increased.

In principle, these drawbacks could partially be mitigated by decreasing the sampling frequency, for example by reducing the frequency from 5 kHz of the example of FIG. 1 down to, e.g. 2 kHz; this leads however to a progressive decrease of the precision since, as previously explained, a high frequency measurement is substantially a direct measurement of the length of the contact area relying upon a precise tracking of the monitoring unit during its passage in the contact area itself.

Further sampling frequency reduction will eventually hinder the possibility of using a direct measurement of the length of the contact area since too few sampling points will be available for a precise monitoring unit tracking in the contact area, i.e. for the reconstruction of the peaks/valleys representing the passage of the monitoring unit in the contact area.

On the other hand, less expensive, relatively cheap monitoring units are currently available on the market. Such monitoring units generally comprise temperature and/or pressure sensors which, in order to save power, are operated only when it is detected that the vehicle starts moving, or which are normally polled from now and then (e.g., every 30 seconds or even longer) and, when it is detected that the vehicle starts moving, are polled more frequently, to make the temperature and/or pressure measurements more frequent. To this purpose, such monitoring units comprise an accelerometer or other inertial sensor, whose output signal is only used to trigger the temperature and/or pressure measurements when it is detected that the tire starts to rotate, so as to save power when the vehicle is at rest (e.g. during parking). Since the pressure or the temperature do not need to be measured at high frequency, such sensors are typically operated at low sampling frequency in order to save power.

In these known, cheap monitoring units, from now on also referred to as "tire rotation-triggered monitoring units" for simplicity, the signal generated by the accelerometer (or other inertial sensor) is only used for "waking up" the tire temperature and/or tire pressure measurements (where "waking up" also includes making the tire temperature and/or tire pressure measurements relatively more frequent than a basic, stand-by measurement rate, which in general is one measurement every 30 seconds or even longer). The signal generated by the accelerometer (or other inertial sensor) is not used for other purposes, i.e., it is not analysed, or processed, in particular for deriving information about tire's deformations.

The Applicant has perceived that the acceleration sensor or other inertial device available on these cheaper monitoring units could be used, by analysing or processing the acceleration signal generated by said sensor it, for detecting the tire deformation, and thus devised the possibility of using such cheaper, low frequency operated monitoring units for a tire monitoring, in particular to provide at least partial information related to the length of the contact area.

An example of an output of the radial acceleration values measured with this kind of low sampling frequency operated sensors is plotted in FIG. 3 to which reference is now made. As for the example of FIG. 1, three consecutive tire round trips of a tire fitted on a vehicle have been tracked at a vehicle speed of 80 km/h. The only difference with respect to the example of FIG. 1 is that FIG. 3 was obtained with a sampling frequency of the radial acceleration of 250 Hz, i.e. twenty times smaller than 5 kHz of the previous example shown in FIG. 1.

As it can be seen, the resulting acceleration profile in the example of FIG. 3 is strongly undersampled and, due to the very few sampling points available, it is impossible to perform a precise tracking of the tire monitoring unit in its approaching, entering, remaining in correspondence, and exiting the contact area.

In other words, from such strongly undersampled profile it is impossible to determine the length of the contact area.

However, the Applicant noticed that even in such extremely undersampled acceleration profile some information still remains related to the passage of the monitoring unit in correspondence of the contact area: in the particular example shown in FIG. 3, samples whose value lay in proximity of, or relatively close to, zero radial acceleration can be considered as being representative of the monitoring unit being in correspondence of the contact area at that sampling time.

It is in fact recalled here that as long as the monitoring unit remains in correspondence of the contact area, the radial acceleration is substantially zero since the monitoring unit is locally moving on a substantially rectilinear path.

The Applicant understood that such very partial information regarding the monitoring unit passing in correspondence of the contact area, which is unusable over a single or few round trips, could be used for performing a monitoring based on a statistical analysis made on measurements carried out over many round trips during tire rolling.

To illustrate this further Applicant's intuition, reference in now made to FIG. 4 wherein radial acceleration is plotted versus time: in this case the graph shows the results of a measurement of the radial acceleration being carried out for about 5 seconds, i.e. a time frame fifteen times longer than in the previously discussed examples of FIG. 1 and FIG. 3, in order to include a relatively high number of tire round trips.

For the sake of a good comparison, as in all the previous examples the vehicle speed has been set to 80 km/h and the sampling frequency is 250 Hz as in the example of FIG. 3.

Differently from FIG. 3, in FIG. 4 it is possible to distinguish a clearer pattern, or a distribution, of sampling points. In particular it can be noticed that a first group of sampling points lays in proximity of, or relatively close to, zero radial acceleration; these sampling points can be considered as being representative of passages of the monitoring unit in correspondence of the tire contact area at the respective sampling times.

On the other hand, all the remaining sampling points can be considered as being representative of the monitoring unit when it is outside the tire contact area at the respective sampling times.

By looking at graphs like the one shown in FIG. 4, the Applicant has then understood that even from an extremely undersampled acceleration signal (or other signal of a measured physical quantity representative of tire deformation) it is still possible to extract, from the overall measurements, data representing passages of the monitoring unit in correspondence of the tire contact area.

The Applicant further understood that by counting the number of passages in a certain amount of time, the probability of finding the monitoring unit in correspondence of the contact area at a certain time during rolling could be estimated: the higher the value of said number in said amount of time, the higher the time spent by said monitoring unit in correspondence of said contact area within said amount of time, and consequently the higher the probability of finding the monitoring unit in correspondence of the contact area at a certain time during tire rolling.

For example such probability can be calculated as the ratio between the number of detected passages in said amount of time and an overall number of measurements within said amount of time at said sampling frequency. As an alternative, such probability can be calculated as the ratio between the cumulated time associated with the detected passages (i.e. the number of detected passages times the sampling period or the inverse of the sampling frequency) and said amount of time.

This led the Applicant to a statistical approach for the estimation of the length of the tire contact area with the rolling surface, or of other parameters related to it, based on the fact that the higher the probability of finding the monitoring unit in correspondence of the contact area at a certain time during tire rolling on the rolling surface, the higher the value of the length of said contact area with respect to the length of the whole tire circumference.

For example, the Applicant perceived that the length of the contact area PL could be estimated based on the tire circumference and on the probability p of finding the monitoring unit in correspondence of the contact area at a certain time during rolling, by using the formula $PL=2\pi Rp$, wherein R is a radius (e.g. a rolling radius) of the tire.

The Applicant surprisingly found that such statistical approach leads to very precise estimation of the length of the contact area, and/or of other parameters related to tires, such as the load exerted on the tire.

By using such statistical approach, the Applicant hence found that it is advantageously possible to perform a real time or substantially real time tire monitoring using less expensive, relatively cheap monitoring units operated at low frequency and with low power needs, without the need of providing complex hardware and software adapted for reconstructing a signal descriptive of the tire deformations and/or for recognizing the start and the end of peaks or valleys or other significant points of such signal.

In a first aspect, the invention concerns a method for monitoring a tire of a vehicle.

The method comprises associating a monitoring unit to said tire. The monitoring unit comprises at least one sensing element adapted to measure at least one quantity descriptive of deformations of said tire.

The method further comprises fitting said tire to a wheel of a vehicle and operating said vehicle so as to cause rotation of said tire on a rolling surface. Due to said fitting and operating, said tire is deformed so as to form a contact area between said tire and said rolling surface.

During the rotation of said tire, said quantity descriptive of deformations of said tire is measured within an amount of time at a sampling frequency lower than about 1.5 kHz, preferably lower than about 1 kHz.

For each measurement of said quantity, it is determined whether the measured quantity has a value representative of a passage of said monitoring unit in correspondence of said contact area, so as to obtain a first number of passages of said monitoring unit in correspondence of said contact area within said amount of time.

The method further comprises estimating at least one parameter related to said tire based on said first number, said amount of time and said sampling frequency. In such way, the monitoring of said tire can be performed based on said at least one estimated parameter.

For example, the monitoring unit can belong to the "tire rotation-triggered monitoring unit" discussed in the foregoing, comprising temperature and/or pressure sensors and an accelerometer or other inertial sensor, in which, in order to save power, the output signal of the accelerometer (or other inertial sensor) is only used for "waking up" the tire temperature and/or tire pressure measurements (where "waking up" also includes making the tire temperature and/or tire pressure measurements relatively more frequent than a basic, stand-by measurement rate). Normally, the signal generated by the accelerometer (or other inertial sensor) is not used for other purposes, i.e., it is not analysed, or processed, in particular for deriving information about tire's deformations. Conversely, in accordance with embodiments of the present invention, the output signal of the accelerometer (or other inertial sensor) is taken as the measure (sampled at low sampling frequency) of the at least one quantity descriptive of deformations of said tire, and it is statistically analysed or processed to derive a parameter descriptive of the tire deformations.

In a second aspect, the invention concerns a method of controlling a vehicle having at least one tire fitted thereon, comprising:

estimating at least one parameter related to said tire by the above method for monitoring a tire;

communicating said at least one parameter related to said tire to a vehicle control system;

adjusting at least one vehicle control parameter within said vehicle control system based on said estimated parameter related to said tire.

Alternatively, said one tire related parameter can be communicated to the driver, for example by providing an audible and/or a visible alert, e.g. on the vehicle dashboard or on a mobile personal device of the vehicle driver, such as a smartphone or a tablet.

In a third aspect, the invention concerns a system for monitoring a tire of a vehicle, comprising a monitoring unit adapted to be associated with said tire.

The monitoring unit comprises at least one sensing element adapted to measure at least one quantity descriptive of deformations of said tire.

The system further comprises at least one processing unit comprising software modules being adapted to estimate at least one parameter related to said tire when said tire is fitted to a wheel of a vehicle and said vehicle is operated so as to cause rotation of said tire on a rolling surface. Due to said fitting and operating said tire is deformed so as to form a contact area between said tire and said rolling surface.

The software modules of the system are adapted to measure said quantity within an amount of time at a sampling frequency lower than about 1.5 kHz, preferably lower than about 1 kHz, during the rotation of said tire.

The software modules are also adapted, for each measurement of said quantity, to determine whether the measured quantity has a value representative of a passage of said monitoring unit in correspondence of said contact area, so as to obtain a first number of passages of said monitoring unit in correspondence of said contact area within said amount of time.

The software modules are also adapted to estimate said at least one parameter related to said tire based on said first number, on said sampling frequency and said amount of time.

The software modules are also preferably adapted to provide said at least one estimated parameter related to said tire to at least one interface to a control system configured to perform the monitoring of said tire based on said at least one estimated parameter.

At least some of the above mentioned software modules can be implemented (e.g. as firmware modules) in a processing unit comprised within the monitoring unit. The software modules adapted to estimate the at least one parameter related to said tire can be implemented in a controlling unit installed or to be installed externally of the tire, e.g. on the vehicle and/or on a personal device of the vehicle driver (e.g. a smartphone or other portable device).

In a fourth aspect, the invention concerns a vehicle having at least one tire fitted thereon, comprising a system for monitoring said at least one tire comprising a monitoring unit as described above, and a vehicle control system being adapted to control said vehicle.

The monitoring unit comprises a transmitting unit adapted for communication of data outside of said at least one tire. Such data comprise at least said first number of passages and/or the estimated parameter related to said tire.

The system for monitoring said tire is adapted to communicate said estimated parameter to said vehicle control system. The vehicle control system is adapted to adjust at least one vehicle control parameter based on said estimated parameter related to said tire.

The system for monitoring the tire and the vehicle control system can be implemented in fully separate devices being in communication with each other, e.g. with a controlling unit being in wireless communication with the monitoring unit placed within the tire and also being in communication (via wireless communication, or using a communication bus available on the vehicle, such as a CAN bus) with the vehicle control system.

However, they can also be implemented at least partially in the same device, such as for example in a board computer of the vehicle being (wirelessly) in communication with the monitoring unit placed within the tire.

In a fifth aspect, the invention concerns a monitoring unit adapted to be associated with a tire.

The monitoring unit comprises at least one sensing element adapted to measure at least one quantity descriptive of deformations of said tire.

The monitoring unit further comprises at least one processing unit comprising software modules being adapted—when said tire is fitted to a wheel of a vehicle and said vehicle is operated so as to cause rotation of said tire on a rolling surface, and wherein due to said fitting and operating said tire is deformed so as to form a contact area between said tire and said rolling surface—to measure said quantity within an amount of time at a sampling frequency lower than about 1.5 KHz, preferably lower than about 1 kHz, during the rotation of said tire.

The software modules of the monitoring unit are also adapted, for each measurement of said quantity, to determine whether the measured quantity has a value representative of a passage of said monitoring unit in correspondence of said contact area, so as to obtain a first number of passages of said monitoring unit in correspondence of said contact area within said amount of time.

The monitoring unit preferably comprises a transmitting unit. The software modules are adapted to communicate to a controlling unit external to said tire said first number of passages or at least one parameter related to said tire estimated based on said first number of passages, said sampling frequency and said amount of time via said transmitting unit.

The software modules of the monitoring unit can be implemented, for example, as firmware modules of the processing unit.

In a sixth aspect, the invention concerns a tire comprising the above described monitoring unit. The monitoring unit can be advantageously secured to a crown portion of the tire, preferably to its inner surface.

In a seventh aspect, the invention concerns the use, for monitoring a tire of a vehicle, of an accelerometer, or other inertial sensor, of a monitoring unit comprising a tire temperature sensor and/or a tire pressure sensor, wherein the accelerometer, or other inertial sensor, is operated at low sampling frequency. Normally, in such monitoring unit an output signal of the accelerometer (or other inertial sensor) is used for triggering the tire temperature and/or tire pressure measurements when the tire starts to rotate. Triggering the tire temperature and/or tire pressure measurements when the tire starts to rotate may also include making the tire temperature and/or tire pressure measurements relatively more frequent than a basic, stand-by measurement rate when the tire does not rotate. Conversely, according to the seventh aspect of the invention, the output signal of the accelerometer (or other inertial sensor) operated at low sampling frequency is taken as a measurement (sampled at low sampling frequency) of at least one quantity descriptive of deformations of the tire during tire rolling on a rolling surface and it is analysed to derive information about deformations of the tire during tire rolling on a rolling surface.

Preferably, for each measurement of said quantity, it is determined whether the measured quantity has a value representative of a passage of said monitoring unit in correspondence of contact area of the tire with the rolling surface, so as to obtain a first number of passages of said monitoring unit in correspondence of said contact area within an amount of time.

Preferably, at least one parameter related to the tire is estimated based on said first number, said amount of time and said sampling frequency. The monitoring of said tire can be performed based on said at least one estimated parameter.

In an eight aspect, the invention concerns a method of monitoring a tire of a vehicle.

The method comprises:
  associating a monitoring unit to said tire, said monitoring unit comprising an accelerometer, or other inertial sensor, and a tire temperature sensor and/or a tire pressure sensor, wherein the accelerometer, or other inertial sensor, is operated at low sampling frequency,
  taking an output signal of the accelerometer, or other inertial sensor, operated at low sampling frequency as a measurement, sampled at low sampling frequency, of at least one quantity descriptive of deformations of the tire during tire rolling on a rolling surface,
  analysing said output signal to derive information about deformations of the tire during tire rolling on a rolling surface.

Preferably, said analysing comprises, for each measurement of said quantity, determining whether the measured quantity has a value representative of a passage of said monitoring unit in correspondence of contact area of the tire with the rolling surface, so as to obtain a first number of passages of said monitoring unit in correspondence of said contact area within an amount of time.

Preferably, analysing comprises:
  estimating at least one parameter related to the tire based on said first number, said amount of time and said sampling frequency, and
  monitoring of said tire based on said at least one estimated parameter.

In one or more of the above aspects, the present invention may comprise one or more of the following preferred features.

The desired operative sampling frequency of the monitoring unit depends on the vehicle speed and/or on the tire revolution speed. For a real time or substantially real time tire monitoring, vehicle speeds in the range of 40 km/h-100 km/h are preferably used. At such speeds, a desired sampling frequency for a statistical analysis to be performed in a fair amount of time may run up to around 1-1.5 kHz.

In preferred embodiments, said sampling frequency is lower than about 750 Hz. Preferably, the sampling frequency is higher than about 50 Hz, more preferably higher than about 150 Hz.

More preferably said sampling frequency is comprised in the range 150 Hz-600 Hz.

The lower the sampling frequency, the lower the monitoring unit power consumption; preferred sampling frequency ranges may be selected in order to ensure that at least one sampling point representative of a passage of the monitoring unit in correspondence of the contact area is, on average, present in the acceleration measurement at least every two tire round trips for typical vehicle speeds, e.g. for a vehicle speed up to 100 km/h.

More preferably, sampling frequency ranges may be selected in order to ensure that at least an average of 0.75 sampling points representative of passages of the monitoring unit in correspondence of the contact area are present in the acceleration measurement per tire round trip, for typical vehicle speeds, e.g. for a vehicle speed up to 100 km/h.

Even more preferably, sampling frequency ranges may be selected in order to ensure that at least an average of one sampling point representative of a passage of the monitoring unit in correspondence of the contact area is present in the acceleration measurement per tire round trip, for typical vehicle speeds, e.g. for a vehicle speed up to 100 km/h.

The measurement of the physical quantity descriptive of the tire deformations may be performed so as to obtain a sequence of measurements of said quantity. In a preferred embodiment, a set of measurements representative of passages of said monitoring unit in correspondence of said contact area can be extracted from said sequence, so as to obtain the above mentioned first number of passages.

To obtain the first number of passages, said sequence of measurements can be either processed (with suitable software/firmware modules) within the monitoring unit or transmitted to a controlling unit external to the tire to which the monitoring unit is associated/secured.

Preferably, an overall number of measurements can be determined, based on said sampling frequency and said amount of time.

In particular, said overall number of measurements can be obtained as the product of said sampling frequency and said amount of time. In this way memory (i.e. data storage capacity) of the monitoring unit and/or calculation time can be saved.

The estimation of the at least one parameter may be preferably performed based on said first number of measurements/passages and said overall number of measurements (e.g. based on the ratio of the first number and the overall number).

The Applicant has also found that power consumption of the monitoring unit can be further optimized by interrupting the measurement of said quantity during a switch off time so as to further decrease power consumption and increase battery lifetime.

This is feasible by determining a second number of "virtual" measurements, that should be performed during said switch off time, but that are actually not performed, which can be estimated based on the sampling frequency and the switch off time, for example as the product of said sampling frequency and said switch off time.

The overall number of measurements can be thus composed by the sum of a number of actual measurements (including the first number of measurements/passages) and said second number of virtual measurements.

The duration of the switch off time is lower than the amount of time used for the whole measurement, and may be selected in a way such that an actual measurement performed during the switch off time would include only sampling points representative of the passage of said monitoring unit outside the contact area. In this way, since such "virtual" sampling points do not contribute to the first number of passages of the monitoring unit in correspondence of the contact area, and can be determined based on the sampling frequency and the duration of the switch off time, their actual measurement can be avoided, so as to save power.

Preferably said switch off time can be set in the range between one third and three quarters of the round trip time.

In preferred embodiments, the measurement of the physical quantity descriptive of the tire's deformations can be interrupted after at least one occurrence of a measurement related with a passage of said monitoring unit in correspondence of said contact area.

The measurement of said quantity is then started again after the switch off time. In a more preferred embodiment, the interruption of the measurement of said quantity may be triggered by the occurrence of a measurement representative of a passage of said monitoring unit in correspondence of said contact area and a consecutive measurement representative of a passage of said monitoring unit outside said contact area. In this way the chances of including sampling points representative of passages of said monitoring unit in correspondence of said contact area within said switch off time are reduced.

In another preferred embodiment said switch off time can be adjusted in response to variations of a rotation speed of said tire. In this way power consumption can be further optimized and the chances of including sampling points representative of passages of said monitoring unit in correspondence of said contact area within said switch off time can be further reduced.

The variation of the tire rotation speed can be communicated to the monitoring unit by a controlling unit external to the tire or can be detected by the monitoring unit itself, for example based on the time difference between two consecutive passages of said monitoring unit in correspondence of said contact area.

In preferred embodiments, the determination of whether the measured quantity descriptive of the tire's deformations has a value representative of a passage of said monitoring unit in correspondence of the contact area is performed by defining a threshold value and comparing the value of said measured quantity with said threshold value.

For example in the case of a radial acceleration profile the threshold value can be set as $V^2/(2R)$, wherein V is the vehicle speed and R is a tire radius. In other words, it is possible to consider as representative of the monitoring unit passage in correspondence of the contact area only those sampling points whose absolute value of radial acceleration is lower than one half of the centripetal/centrifugal acceleration to which the monitoring unit is subjected during rotation outside the contact area.

It is understood that if other quantities descriptive of the tire deformation are used instead of radial acceleration, threshold value and comparison criteria (value lower or higher than the threshold) can vary accordingly.

In a further preferred embodiment the threshold can be set to an initial value before starting the measurement of said quantity, and then can be adjusted, for example in response to variations of the rotation speed of said tire.

Threshold value adaptation with tire rotational speed allows reducing occurrence of possible errors in determining whether a sample is representative of a passage of the monitoring unit in correspondence of the contact area, ultimately increasing the precision and the accuracy of the estimation of the parameters related to the tires.

For example, when said measured quantity is the radial acceleration, the absolute value of said threshold is increased upon tire rotational speed increasing and viceversa.

In a further preferred embodiment, at least the initial value of the threshold is communicated to the monitoring unit from a controlling unit external to said tire.

This is particularly convenient for those monitoring units with a low degree of hardware complexity comprising a minimal amount of hardware necessary to carry out a measurement of the quantity descriptive of tire deformations. In such cases, part of the processing can be carried out in a processing unit of the controlling unit external to said tire, to which data are transmitted.

In another preferred embodiment the controlling unit communicates not only the initial value of the threshold but also the subsequent values of said threshold, adjusted in response to variation of tire rotation speed.

In preferred embodiments, the monitoring unit is secured to a crown portion of said tire, more preferably to an inner surface of the tire.

In preferred embodiments, the monitoring unit comprises at least one sensing element adapted to measure at least a radial acceleration of said crown portion during rotation of said tire.

Securing said monitoring unit to a crown portion of a tire, close to, or even embedded in, the tire tread, is advantageous since it is easier to measure a quantity descriptive of tire deformations, and thus more precisely identifying the occurrences of passages of the monitoring unit in correspondence of the tire contact area.

As previously noticed, among tire's parameter to be monitored during tire rolling, the length of the contact area is one of the most challenging to be estimated and at the same time it is one of the most useful since it may be used in the determination other tire related parameters, such as the load exerted by the vehicle on a tire.

The Applicant has found that the invention herein described is particularly suitable for the estimation of a length of the tire contact area with the tire rolling surface, by using the statistical approach previously described. The first number and the overall number of measurements (or other number describing the whole statistic set of measurements derivable from the sampling frequency and the amount of time) can be directly used to estimate the probability of finding the monitoring unit in correspondence of the contact area. A length of the contact area can be obtained based on those numbers, for example as the product of the tire circumference and the ratio between said first number and said overall number of measurements.

Depending on the tire related parameter to be estimated, it could be convenient to include pressure and/or temperature sensing elements within the monitoring unit. This minimizes hardware complexity and/or eliminates the need of communication between a plurality of monitoring units secured to different portions of the tire or to the wheel.

As previously underlined, the present invention can be used to estimate different parameters related to a tire. In a preferred embodiment, said at least one parameter related to said tire is a load exerted on said tire by said vehicle.

Tire pressure together with the length of the contact area (PL) can be used to estimate tire load. For example, the load Fz exerted by the vehicle on the tire can be calculated from the length of the contact area based on a polynomial fitting function of the contact length, e.g. by using the following formula 1) or formula 2):

$$Fz = A(P) + B(P)*PL \qquad 1)$$

$$Fz = A(P) + B(P)*PL + C(P)*PL^2 \qquad 2)$$

wherein P is the tire pressure, PL is the length of the contact area and A, B, C are calibration parameters depending on the tire pressure P, whose values can be obtained by a calibration performed for the tire model to which the monitoring unit is to be associated. Calibration can be performed by using conventional testing machines on which a tire inflated at a controlled pressure and temperature is rotated over a conveyor belt under controlled conditions of exerted load and rotation speed.

In a more preferred embodiment, the load Fz exerted by the vehicle on the tire can be more precisely calculated from the contact area length (PL) based on a polynomial function of the contact length (PL) wherein the coefficients of said polynomial function further depend on tire pressure, temperature and rotation speed, e.g. according to the following formula 3) or formula 4):

$$Fz = A(P,\omega,T) + B(P,\omega,T)*PL \qquad 3)$$

$$Fz = A(P,\omega,T) + B(P,\omega,T)*PL + C(P,\omega,T)*PL^2 \qquad 4)$$

wherein P is the tire pressure, T is the tire temperature, PL is the length of the contact area, $\omega$ is the tire rotational speed and $A(P,\omega,T)$, $B(P,\omega,T)$, $C(P,\omega,T)$ are calibration parameters depending on the tire pressure, tire rotation speed and tire temperature.

The Applicant has further noticed that the present invention leads to a more precise outcome if it is carried out in a way that during the measurement the kinematic and/or dynamic conditions acting on a tire do not undergo a substantial variation, i.e. in static or quasi static running conditions.

In preferred embodiments, the measurement of the quantity descriptive of tire deformations is started when at least one of the following access conditions is met:
- a speed of said vehicle is comprised within a predetermined speed range, preferably within about 40 km/h and about 100 km/h, more preferably within about 60 km/h and about 80 km/h
- an absolute value of longitudinal acceleration (i.e. the acceleration in the same direction of motion of the vehicle) of said vehicle is lower than a predetermined amount, preferably below about 0.3 m/s$^2$.

In more preferred embodiments, a further access condition to be met may be provided, by which an absolute value of lateral acceleration (i.e. the acceleration in a direction perpendicular to the direction of motion of the vehicle) of said vehicle is lower than a predetermined amount, preferably below about 0.3 m/s$^2$.

As previously discussed, the present invention relies on the accumulation of a statistical set of measurements obtained over many tire round trips performed by the tire during rolling in an amount of time.

In preferred embodiments, the present invention further comprises stopping the measurement of the quantity descriptive of tire deformations when said amount of time exceeds a predetermined maximum amount of time. Preferably said maximum amount of time may be comprised between about 5 seconds and about 30 seconds, more preferably said maximum amount of time is comprised between about 10 seconds and about 20 seconds.

It is thus worthy to notice that the present invention makes possible a real time or substantially real time monitoring of the tire related parameter in a fast and simple way.

Further stopping conditions may be defined, for example to track that the kinematic or dynamic conditions are changing, or have changed, to an extent not compatible with the accuracy requested by the vehicle control system.

For example, in preferred embodiments, the present invention further comprises stopping the measurement of said quantity when at least one of the following stopping conditions is met:
- an absolute value of longitudinal acceleration of said vehicle exceeds a predetermined acceleration threshold, preferably about 0.3 m/s$^2$.
- a speed of said vehicle is outside a predetermined speed range, preferably below about 40 km/h or preferably above about 100 km/h.

A further stopping condition to be met may be provided, by which an absolute value of lateral acceleration of said vehicle is higher than a predetermined amount, preferably the absolute value of lateral acceleration of said vehicle is higher than about 0.3 m/s$^2$.

In further embodiments, one or more of the above stopping conditions may be used to discard at least one subset of performed measurements. For example, the measurements can be performed by the monitoring unit in a predefined amount of time, and if it is evaluated that during said predefined amount of time one or more of the above stopping conditions have been met, the whole set of measurements is discarded and the tire related parameter or parameters is/are not estimated.

The monitoring unit implementing the method of this invention can comprise a transmitting and/or a receiving section to communicate with a controlling unit external to said tire.

The outcome of the measurement results and/or the estimated tire related parameters can be communicated by the monitoring unit to the controlling unit. Those data may be then communicated to devices on board the vehicle, so that all the detected information can be provided to the driver and/or vehicle control systems.

Tire related information may also be transmitted outside the vehicle, e.g. to one or more driver's personal devices or remote servers (e.g. cloud servers).

As previously discussed, the at least one estimated tire related parameter can be used by the vehicle control system to adjust at least one vehicle control parameter.

As an example, the vehicle control system may comprise a brake control system, and said adjusting at least one vehicle control parameter may comprise adjusting a braking force on said tire (e.g. based on the estimated length of the contact area or based on the estimated load).

Alternatively or in combination, the vehicle control system may comprise a steering control system, and said adjusting at least one vehicle control parameter may comprise selecting a maximum variation allowed from steering commands (e.g. based on the estimated length of the contact area or based on the estimated load).

Alternatively or in combination, the vehicle control system may comprise a suspension control system, and said adjusting at least one vehicle control parameter may comprise adjusting a stiffness of a suspension spring associated to said tire (e.g. based on the estimated load).

Alternatively or in combination, the vehicle control system may comprise an evaluator of a vehicle range, i.e. a residual mileage available to the vehicle (e.g. based on an available fuel and/or on an available battery power in an electrically driven vehicle), and said adjusting at least one vehicle control parameter may comprise adjusting said residual mileage (e.g. based on the estimated load).

Alternatively or in combination, the at least one estimated tire related parameter can be communicated to the vehicle driver, for example by providing an audible and/or a visible alert, e.g. on the vehicle dashboard or on a mobile personal device of the vehicle driver, such as a smartphone or a tablet.

BRIEF DESCRIPTION OF THE DRAWINGS

The above, as well as additional features and advantages of the invention will be better apparent from the following description of some preferred embodiments thereof, made hereinafter for exemplifying and non limiting purposes, to be read with reference to the attached figures, in which.

DETAILED DESCRIPTION OF EMBODIMENTS OF THE INVENTION

Figure 5:
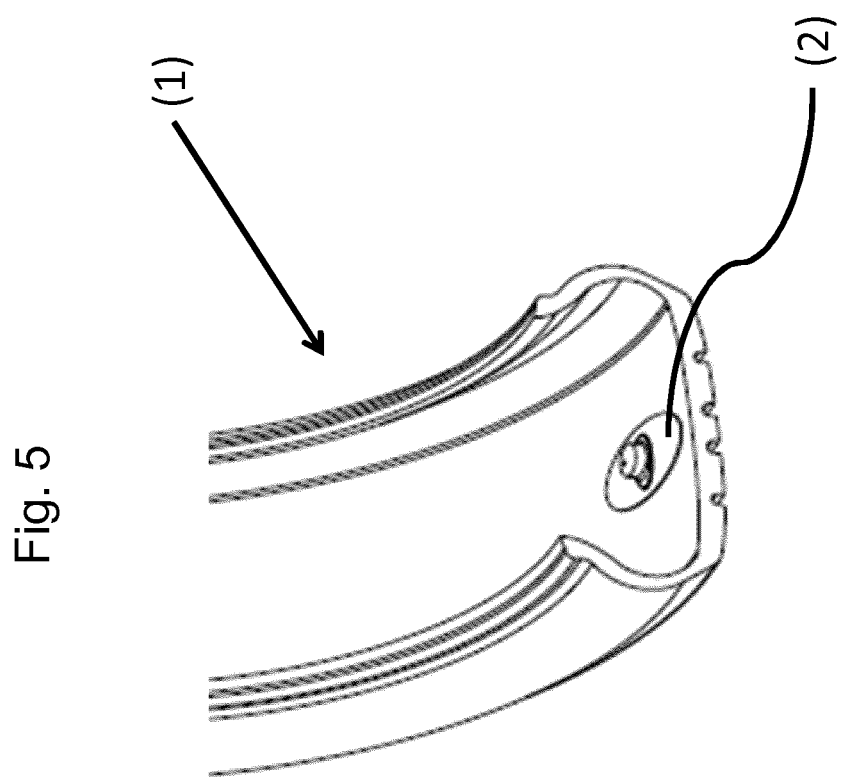
FIG. 5 shows a monitoring unit fitted into a tire.

Reference is made to FIG. 5 showing a portion of a tire (1) comprising a monitoring unit (2) adapted, configured to work at low sampling frequency, e.g. lower than 1-1.5 kHz.

Said monitoring unit (2) is secured to a crown portion of said tire (1), preferably substantially in correspondence of the equatorial plane of the tire. In particular, the monitoring unit (2) may be glued or connected via an adhesive tape to the inner liner of the tire.

Figure 6:
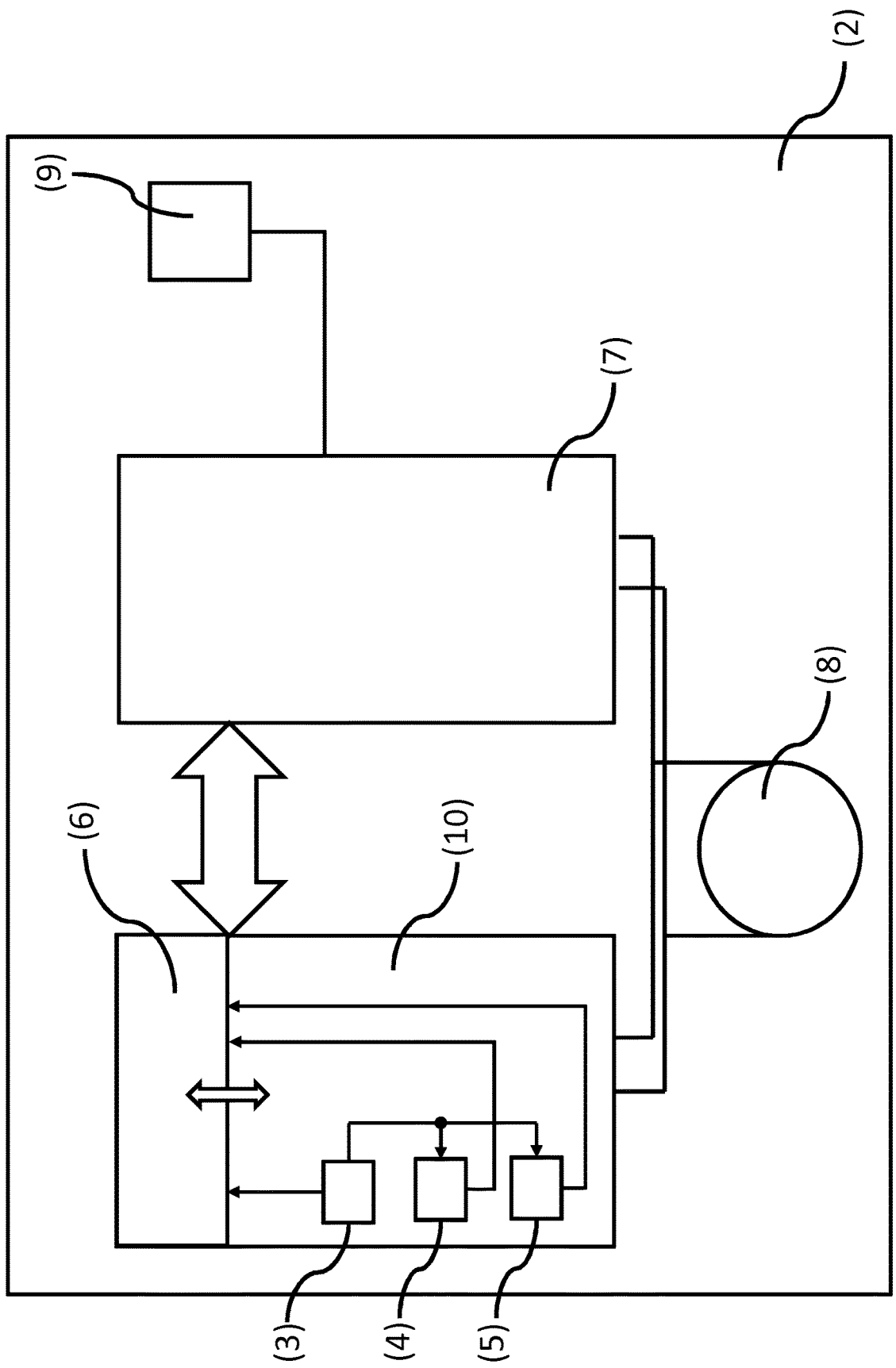
FIG. 6 shows a scheme of a monitoring unit according to an embodiment of the invention.

With reference to FIG. 6, the monitoring unit (2) comprises a sensing section (10), a battery (8), a processing unit (or CPU) (6) associated with a memory, a transceiver (7), an antenna (9).

The monitoring unit (2) can be a relatively cheap ("tire-rotation triggered monitoring unit" as defined in the foregoing), currently available on the market (e.g., tire pressure monitoring sensing unit model FXTH87, produced by NXP Semiconductors), generally comprising temperature and/or pressure sensors and an accelerometer or other inertial sensor, whose output signal is only used for "waking up" the tire temperature and/or tire pressure measurements (where "waking up" also includes making the tire temperature and/or tire pressure measurements relatively more frequent than a basic, stand-by measurement rate), that is, an accelerometer which is operated at low sampling frequency in order to save power so as to save power when the vehicle is at rest (e.g. during parking). According to an embodiment of the present invention, the acceleration sensor or other inertial device available on such low frequency operated monitoring unit is used for detecting the tire deformation, i.e., the output signal of the acceleration sensor (or other inertial device) is analysed, or processed, to derive information about tire deformations.

Particularly, the sensing section (10) of the monitoring unit (2) comprises an accelerometer (3), particularly a radial accelerometer, oriented within the monitoring unit (2) so as to have an axis substantially orthogonal to the inner surface of the tire. The accelerometer (3) is configured to output an acceleration measurement descriptive of deformations in radial direction which said tire (1) undergoes during rolling. Other sensing elements adapted for measuring physical quantities descriptive of tire deformations could be used, such as tangential accelerometers, lateral accelerometers, strain gauges, etc.

The sensing section (10) of said monitoring unit (2) further comprises a pressure sensor (4) configured to output a measurement of the pressure internal to said tire (1). The sensing section (10) of the monitoring unit (2) further comprises a temperature sensor (5) configured to output a measurement of the temperature of said tire (1).

The accelerometer (3) is configured to operate at low sampling frequency and to output a trigger signal for triggering the tire pressure and temperature measurements by the pressure sensor (4) and the temperature sensor (5). According to an embodiment of the present invention, the measurement at low sampling frequency of the acceleration descriptive of deformations in radial direction which said tire (1) undergoes during rolling outputted by the accelerometer (3) is provided to the central processing unit, CPU, (6).

The central processing unit, CPU, (6) is configured, via suitable software/firmware modules, to receive, from the sensing section (10), data related to the measurements performed by the radial accelerometer (3) and the temperature and pressure sensors (4,5). The CPU (6) is also configured, via suitable software/firmware modules, to process the data received from said sensors and accelerometer (3,4,5) in order to obtain, from said data, tire related parameters (such as the length of the tire contact area with the tire rolling surface and/or the load exerted on a tire). Alternatively, the CPU (6) can be configured, via suitable software/ firmware modules, to process said data up to a certain extent, i.e. to perform only part of the processing, and then to send the processing results to an external controlling unit, via the transceiver (7) and the antenna (9), to complete the processing up to obtain said tire related parameters. The CPU (6) may be also configured, via suitable software/firmware modules, to receive access and/or stopping conditions from the external controlling unit. The access conditions may be used by the CPU (6) as a trigger to command the sensing section (10) to start the measurements needed for the estimation of the tire related parameters, and/or to start the processing needed for the estimation of the tire related parameters. The stopping conditions may be used by the CPU (6) as a trigger to stop or suspend the measurements performed by the sensing section (10), and/or to stop or suspend the processing needed for the estimation of the tire related parameters.

The transceiver section (7) is configured for bidirectional communication via the RF antenna (9) with an external controlling unit specifically configured for communication with the monitoring units (2) comprised within the tires of a vehicle. Alternatively, the transceiver section (7) can directly communicate, via the RF antenna (9), with a vehicle control system, such as the vehicle board computer. In preferred embodiments, the transceiver (7) comprises a Bluetooth Low Energy (BLE) module.

The battery (8) directly or indirectly feeds electrical power to the various components of the monitoring unit (2). In preferred embodiments, it can be a battery rechargeable with power scavenged from mechanical energy caused by tire rotation.

Figure 7:
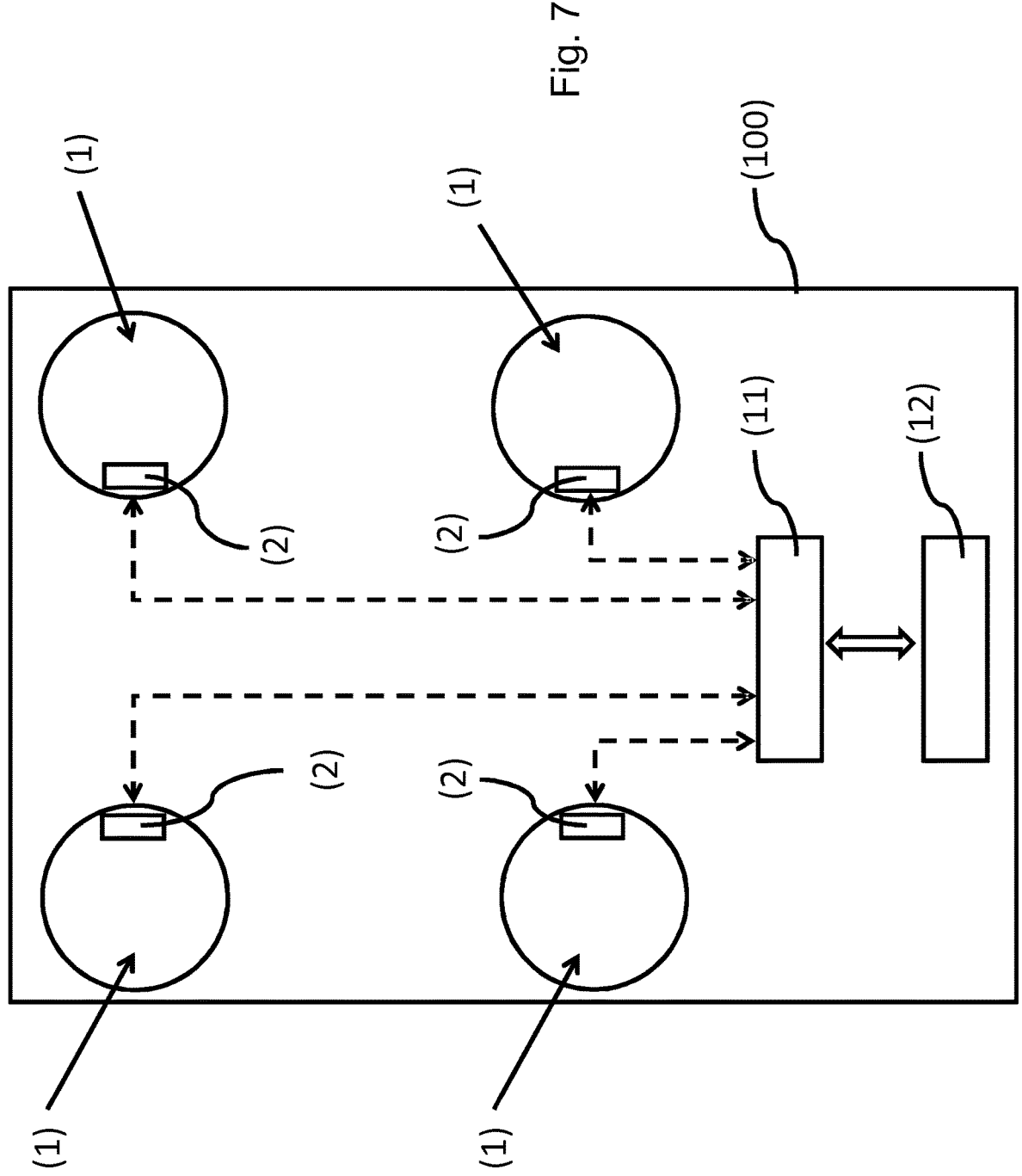
FIG. 7 shows a scheme of a vehicle comprising a tire monitoring system and a vehicle control system according to an embodiment of the invention.

FIG. 7 schematically shows an embodiment of a system for monitoring tires. The system is implemented in a vehicle (100) fitted with four tires (1), each of which comprising a respective monitoring unit (2). The vehicle (100) may be for example a car. However, the present invention also applies to other kinds of vehicles, such as two or three wheeler scoters, motorbikes, tractors, buses, trucks or light trucks, i.e. to vehicles with two, three, four, six or more wheels distributed on two or more axles. The vehicle (100) can be driven by electrical power, or relying on thermal propulsion or it can be a hybrid vehicle.

The monitoring units (2) are in communication with a controlling unit (11). The controlling unit (11) is in communication with a vehicle control system (12) configured for adjusting vehicle control parameters based on tire related parameters estimated by the monitoring units (2) and/or by the controlling unit (11). The vehicle control system (12) can be the control board computer of the vehicle (100), and/or a subsystem configured for adjusting at least one of said vehicle control parameters (e.g. a suspension control subsystem, a brake control subsystem, a steering control subsystem, a module configured for estimating a residual mileage of the vehicle).

Typically, the communication between the monitoring units (2) and the controlling unit (11) is a wireless communication (e.g. Bluetooth communication). The communication between the controlling unit (11) and the vehicle control system (12) can be wireless and/or wired (e.g. on a CAN BUS). In other preferred embodiments, the controlling unit (11) can be a hardware of software module implemented in the vehicle control system (12).

The controlling unit (11) is external with respect to the tires (1) wherein the monitoring (2) unit are secured. Said controlling unit (11) can be placed anywhere in the vehicle which can be reached by the wireless (e.g. Bluetooth) signal transmitted by the monitoring units (2).

For example, the external controlling unit (11) can be a box attached to the vehicle windshield. In another embodiment, the external controlling unit (11) can be a mobile personal device of the vehicle driver (e.g. a smartphone or a tablet), provided with suitable software applications/modules configured at least for communication with the monitoring units (2), as well as for processing data received from the monitoring units (2).

Figure 8:
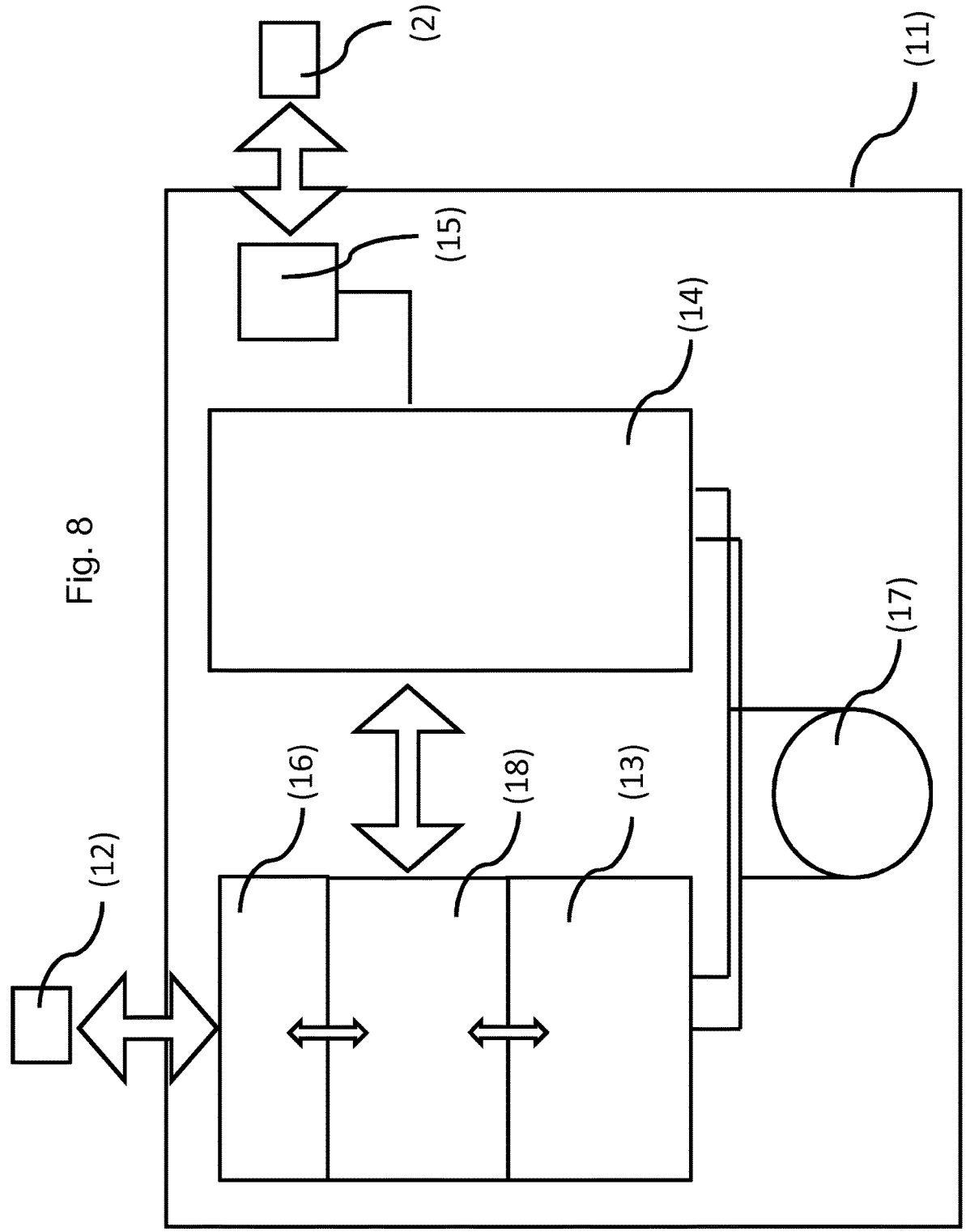
FIG. 8 shows a scheme of a controlling unit according to an embodiment of the invention.

FIG. 8 schematically shows an embodiment of a controlling unit (11) suitable for the system for monitoring tires of FIG. 7. The controlling unit (11) comprises a GPS unit (13), a transceiver section (14), a RF antenna (15), an interface (16) to the vehicle control system (12), a battery (17), a processing unit (18) associating with a memory.

In the preferred embodiment shown in FIG. 8, the controlling unit (11) comprises a GPS unit (13). Alternatively, the controlling unit (11) may use data provided by an external GPS unit, for example a GPS unit on the vehicle or on a mobile personal device of the vehicle driver, such as a smartphone or a tablet.

The transceiver section (14) of the controlling unit (11) is configured for bidirectional communication via a RF antenna (15) with the monitoring units (2). In preferred embodiments, the transceiver section (14) comprises a Bluetooth Low Energy (BLE) module.

The interface (16) can be a CAN BUS interface adapted for bidirectional communication with the vehicle control system (12).

The battery (17) directly or indirectly feeds electrical power to the various components of the controlling unit (11). In other embodiments, the controlling unit (11) can be powered by the vehicle battery, via the interface (16).

The processing unit, CPU, (18) of the controlling unit (11) is configured, via suitable software/firmware modules, to receive data from the monitoring units (2) comprised within the tires. Such data may comprise tire parameters estimated by the monitoring units (2), or measurements performed by the monitoring units (2), or results of partial processing performed on said measurements by the monitoring units (2). The CPU (18) is also configured, via suitable software/firmware modules, to process such data in order to estimate at least one tire related parameter. The CPU (18) may be also configured, via suitable software/firmware modules to monitor access and/or stopping conditions to be applied for triggering starting and/or stopping/suspending the estimation of the tire related parameter(s), and/or possibly discarding those measurements performed during acquisitions occurred within time intervals in which those access conditions were not met.

Ultimately the choice of whether distributing the processing between the monitoring units (2) and the external controlling unit (11) for the tire related parameter estimation is a tradeoff between several constraints to be balanced, such as: hardware complexity, battery consumption, cost, processing power available to the CPU of the monitoring units, etc. In the preferred embodiment shown in FIG. 8, the tire related parameter or parameters estimated by the CPU of the monitoring units (2) and/or by the CPU of the controlling unit (11) is/are eventually made available to the vehicle control system (12) via the interface (16).

In an exemplary operation mode, each tire (1) fitted to a wheel of the vehicle (100) is caused to rotate on a rolling surface. As a consequence of the fitting, the tire is deformed so as to form a contact area between the tire (1) and the rolling surface. Each monitoring unit (2) comprised within a tire (1) is preferably paired with said tire, i.e. identifying information of the tire (e.g. tire identifier, tire size, tire model, tire radius etc.) is stored within the memory associated with the CPU (6) of the respective monitoring unit (2).

Pressure and temperature measurements can be performed by the monitoring unit (2) comprised within the tire (1) at discrete time intervals, for example every 30 seconds or upon request of said controlling unit (11) at any time during tire rolling. The start of pressure and temperature measurement can be triggered based on a signal sent by the accelerometer (3) when the tire starts to rotate, or upon request from the external controlling unit (11) or the vehicle control system (12).

The controlling unit (11) monitors the vehicle status based on GPS data.

When the speed of the vehicle (100) is between 40 km/h and 100 km/h (or more preferably within 60 km/h and 80 km/h) and/or when the absolute value of the longitudinal acceleration is lower than 0.3 m/s$^2$, the controlling unit (11) determines that the access conditions are met and communicates to each of the monitoring units (2) to start the measurement of the selected physical quantity representative of the tire deformation, e.g. the radial acceleration, in order to start the estimation of at least one tire related parameter. A further access condition may be based on the check that the absolute value lateral acceleration of the vehicle is lower than 0.3 m/s$^2$.

The controlling unit (11) further communicates to each of the monitoring units (2) the speed V of the vehicle so that said monitoring units (2) can set an initial absolute threshold value for the acceleration, e.g. as $V^2/(2R)$, wherein R is a tire radius. Alternatively the controlling unit (11) can communicate to said monitoring units (2) the initial value of said threshold.

The controlling unit (11) may also communicate the amount of time to be allocated for the measurements, or the overall number of measurements to be performed. The amount of time or the overall number of measurements can also be directly stored in the software/firmware of each monitoring unit (2). In particular, the amount of time should be long enough to encompass several complete tire roundtrips at the vehicle speeds of interest. For example, the amount of time can be of several seconds (e.g. 10 seconds).

When the measurement is started, the radial acceleration is measured at a low sampling frequency below 1-1.5 kHz, for example 250 Hz. Preferably, an overall number of at least one thousand of measurements is performed within the allocated amount of time. For example, a monitoring unit working at 250 Hz will perform an overall number of 2500 measurements in 10 seconds.

During the radial acceleration measurements, the value of each measurement is compared with said threshold value in order to determine whether each sample value can be considered as representative of a passage of the monitoring unit in correspondence of the contact area between the tire and the rolling surface.

In this particular case, having set the initial threshold value as $0.5*V^2/R$, radial acceleration samples whose absolute value is lower than said threshold will be considered as representative of passages of said monitoring unit in correspondence of the contact area. In fact, as long as the monitoring unit remains in correspondence of the contact area, the radial acceleration is substantially zero since the monitoring unit is locally moving on a substantial rectilinear path.

The threshold value, initially set as $V^2/(2R)$, can be changed in response to variation of the rotation speed of said tire (1). The updated threshold value can be communicated by said external controlling unit (9) to each of said monitoring units (2) or can be calculated by each monitoring unit (2) itself.

In the latter case, an estimation of the rotation speed of the tire (1) can be carried out internally in each monitoring unit (2) by estimating the round trip time based on the time interval between consecutive values or groups of values lower than the set threshold. The estimated round trip time is used for obtaining the tire rotation speed and/or an updated speed of the vehicle, which can be used to update the threshold value.

The determination of whether a sample can be considered as representative of a passage of the monitoring unit (2) in correspondence of the contact area can be carried out sample by sample. Alternatively, a sequence of measurements can be obtained, followed by an extraction from said sequence of a set of measurements having values representative of passages of said monitoring unit (2) in correspondence of said contact area.

In both the aforementioned cases, the occurrences of the values representatives of passages of the monitoring unit (2) in correspondence of the contact area are counted by CPU of the monitoring unit (2), so as to obtain a first number of passages of said monitoring unit (2) in correspondence of said contact area. Preferably, the overall number of measurements is also determined by counting the measurements carried out. Alternatively the overall number of measurements can be directly obtained as the product of said sampling frequency and said amount of time, or the ratio between the amount of time and the sampling period (i.e. the inverse of the sampling frequency).

Said first number of passages can be used by the monitoring unit (2) to estimate at least one tire related parameter or can be communicated to said external controlling unit (11) or directly to the vehicle control system (12).

In particular, this first number can be used for determining the probability of said monitoring unit (2) to be in correspondence of the contact area at a certain time, which can be calculated for example as the ratio between said first number and said overall number of measurements (2500 measurements in this example).

Alternatively, said probability can be calculated as the ratio between the time spent by the monitoring unit (2) in correspondence with the contact area (i.e. the ratio between the first number of measurements and the sampling frequency, or the product of the first number of measurement and the sampling period) and said amount of time in which the measurement is carried out (10 seconds in this example).

To determine the overall number of measurements, it is not really necessary to actually carry out and/or count the radial acceleration measurements at each sampling period. Measurements within tire round trips to be performed when the monitoring unit (2) is certainly not in correspondence of the contact area can be skipped and substituted by "virtual measurements" which are not actually carried out. In such case, the overall number of measurements is determined as the sum of the number of actual measurements carried out and the number of virtual measurements. Advantageously, this can result in a significant saving of the energy used by the battery (8) of the monitoring unit (2) for the estimation of the at least one tire related parameter, ultimately increasing the lifespan of its battery (8).

The CPU (6) of the monitoring unit (2) can thus be configured, via suitable software/firmware modules, to switch off the measurement of the radial acceleration value during a switch off time comprised between two consecutive passages of said monitoring unit in correspondence of said contact area, i.e. within a round trip outside said contact area. Such software/firmware modules are also configured for determining the number of virtual measurements (i.e. the number of measurement not actually carried out) based on the sampling frequency and said switch off time.

This is particularly convenient in the embodiment wherein the monitoring unit (2) calculates the time occurring between two consecutive round trips. In this case, said switch off time can be preferably set in the range between one third and three quarters of the round trip time.

At the expiring of a maximum amount time allocated for the radial acceleration measurement, the external controlling unit (11) communicates each monitoring unit (2) to stop the acceleration measurements and to communicate their outcome, for example said first number of measurements.

Alternatively said external controlling unit (9) can communicate each monitoring unit (2) to stop the measurements when some stopping conditions are met, for example if the vehicle speed is outside a predetermined speed range or if an absolute value of the longitudinal acceleration exceeds a predetermined acceleration threshold.

Alternatively the monitoring unit (2) itself can stop the acceleration measurement at the expiring of the maximum amount of time, or, in the embodiment previously described wherein said monitoring unit (2) can estimate the vehicle speed, when at least one of the rotation/vehicle speed or the longitudinal acceleration is outside a predetermined range.

Once the acceleration measurement is over, the following quantities are available to the tire monitoring system for the estimation of a tire related parameter: a first number of passages of said monitoring unit in correspondence of the contact area during the amount of time allocated for the measurements; an overall number of (actual and possibly virtual) measurements, or its corresponding value calculated based on the sampling frequency and the amount of time allocated; tire pressure and/or temperature.

Based on such data, at least one tire related parameter can be estimated.

In preferred embodiments, the length of the contact area and/or the load exerted on the tire (1) can be estimated.

As previously discussed, the tire related parameter can be estimated by said monitoring units (2), or by the external controlling unit (11), or by the vehicle control system (12).

For example, the CPU (6) of the monitoring units (2) can process the acceleration data and send to the external control unit (11) the first number N1 of measurements representative of passages of each monitoring unit in correspondence of the contact area, the overall number N2 of (actual and possibly virtual) measurements, the tire pressure and the temperature values. The CPU (18) of the controlling unit (11) can then estimate the length of the contact area and/or the load exerted on the tires based on such data.

In particular, based on the fact that the set of measurements performed in the amount of time at the sampling frequency is a statistic set, the ratio N1/N2 corresponds to a probability p of finding each monitoring unit in correspondence of the contact area of the respective tire at a certain time during tire rolling.

A length of the contact area PL could be then estimated based on the tire circumference and such probability p, by using the formula $$PL = 2\pi R\, p = 2\pi R\, N1/N2$$

wherein R is a radius (e.g. a rolling radius) of the tire.

The tire pressure and the length of the contact area PL can be then used to estimate the load exerted on the tire.

For example, the load Fz exerted by the vehicle on the tire can be calculated from the estimated length of the contact area PL based on a polynomial fitting function of the contact area length, e.g. by using the above mentioned formulas:

$$Fz=A(P)+B(P)*PL$$

$$Fz=A(P)+B(P)*PL+C(P)*PL^2$$

wherein P is the tire pressure, PL is the length of the contact area and A, B, C are calibration parameters depending on the tire pressure P, whose values can be obtained by a calibration performed for the tire model to which the monitoring unit is associated. The calibration can be performed by using conventional testing machines on which a tire inflated at a controlled pressure and temperature is rotated over a conveyor belt under controlled conditions of exerted load and rotation peed. Such calibration coefficient A, B, C could be stored in the memory of the monitoring unit, the controlling unit and/or communicated to the vehicle control system.

In a more preferred embodiment, the load Fz exerted by the vehicle on the tire can be more precisely calculated from the contact area length PL based on a polynomial function of the contact length PL wherein the coefficients of said polynomial function further depend on tire pressure and rotation speed, e.g. according to above mentioned formulas:

$$Fz=A(P,\omega,T)+B(P,\omega,T)*PL$$

$$Fz=A(P,\omega,T)+B(P,\omega,T)*PL+C(P,\omega,T)*PL^2$$

wherein P is the tire pressure, PL is the estimated length of the contact area, $\omega$ is the tire rotational speed and $A(P,\omega,T)$, $B(P,\omega,T)$, $C(P,\omega,T)$ are calibration parameters depending on the tire pressure, tire rotation speed and tire temperature Once the at least one tire related parameter has been estimated, it can be passed to the vehicle control system (12).

The vehicle control system (12) can perform the vehicle control by adjusting at least one vehicle control parameter based on an estimated tire parameter received by the external controlling unit (11) or from said monitoring units (2). For example, the vehicle control system can activate or adjust to the best alarm systems and/or vehicle dynamics control, braking, steering etc. In addition information about the vehicle status or tire related parameters (pressure, temperature, length of the contact area, load) can be communicated to the driver or can be used remotely, i.e. transmitted outside the vehicle, e.g. to one or more driver's personal devices or cloud servers.

In preferred embodiments, the vehicle control system (12) may comprise a brake controller (for example, an anti-lock brake unit), and/or a steering controller, and/or a suspension controller, and/or an engine controller, and/or a transmission controller.

For example, a vehicle brake control system may adjust the braking force on each tire according to the load on the tire.

As another example, the loads on each tire may be used to determine the vehicle stability envelope and to select the maximum variation allowed from steering commands. This information may be applicable to a steering control system (Electrically Assisted Steering Systems) to limit the yaw rate.

As another example, a vehicle suspension control system may adjust the stiffness of the suspension springs for each tire according to the load on the tire. Furthermore, a sensed unequal load distribution between left fitted tires and right fitted tires could be compensated by an Active Roll Control system, that currently use sensed lateral acceleration to increase the hydraulic pressure to move stabilizer bars, in order to remove a vehicle lean when cornering.

The conditions of the vehicle may indicate that the performance of the vehicle is reduced and that the driver should restrict his driving maneuvers. The vehicle control system itself can take action, for example in order to limit the maximum vehicle speed to maintain stability and not exceed the tire specifications, or to limit steering yaw rate in order to keep rollovers from occurring. The driver may be alerted to the current vehicle control system condition and of the actions that the vehicle control system has taken on his behalf to safe the vehicle (reducing the maximum attainable speed, steering rate, engine power), as needed on a display device. On the same display device it may also be shown whether he should take further action on his own (inflate the tires in case of excessive load not compliant with the current inflation pressure of the tires, change the distribution of mass, restrict driving maneuvers and speed). The display device may comprise a visual and/or an audible unit, for example located in the dashboard of the vehicle.

Alternatively or in combination, the vehicle control system may comprise an evaluator of a vehicle range, i.e. a residual mileage available to the vehicle (e.g. based on an available fuel and/or on an available battery power in an electrically driven vehicle), so that the vehicle control system may perform an adjustment of the residual mileage, e.g. based on the estimated load.

EXAMPLES

The tire monitoring method and system of the present invention have been tested with different vehicles and tires models.

In a first example, a FIAT DAILY 35C15 light truck has been used, equipped with Pirelli tires model CARRIER 195175R16. All the six tires of said light truck have been fitted with monitoring units (2) according to the scheme illustrated in FIG. 5 and FIG. 6. The monitoring units included a tire pressure monitoring sensing unit model FXTH87, produced by NXP Semiconductors, operating at a sampling frequency of 250 Hz and comprising a two axis accelerometer. The monitoring units were installed into the tires so as to align one of the two axes with the radial direction.

A controlling unit communicating via Bluetooth with the monitoring units has been installed within the car. The controlling unit estimated the length of the contact area based on the measurements performed by the monitoring units.

At the same time each tire (1) has been fitted also with a high frequency operated radial acceleration sensor to have precise measurement of the length of each tire contact area during rolling.

Figure 1:
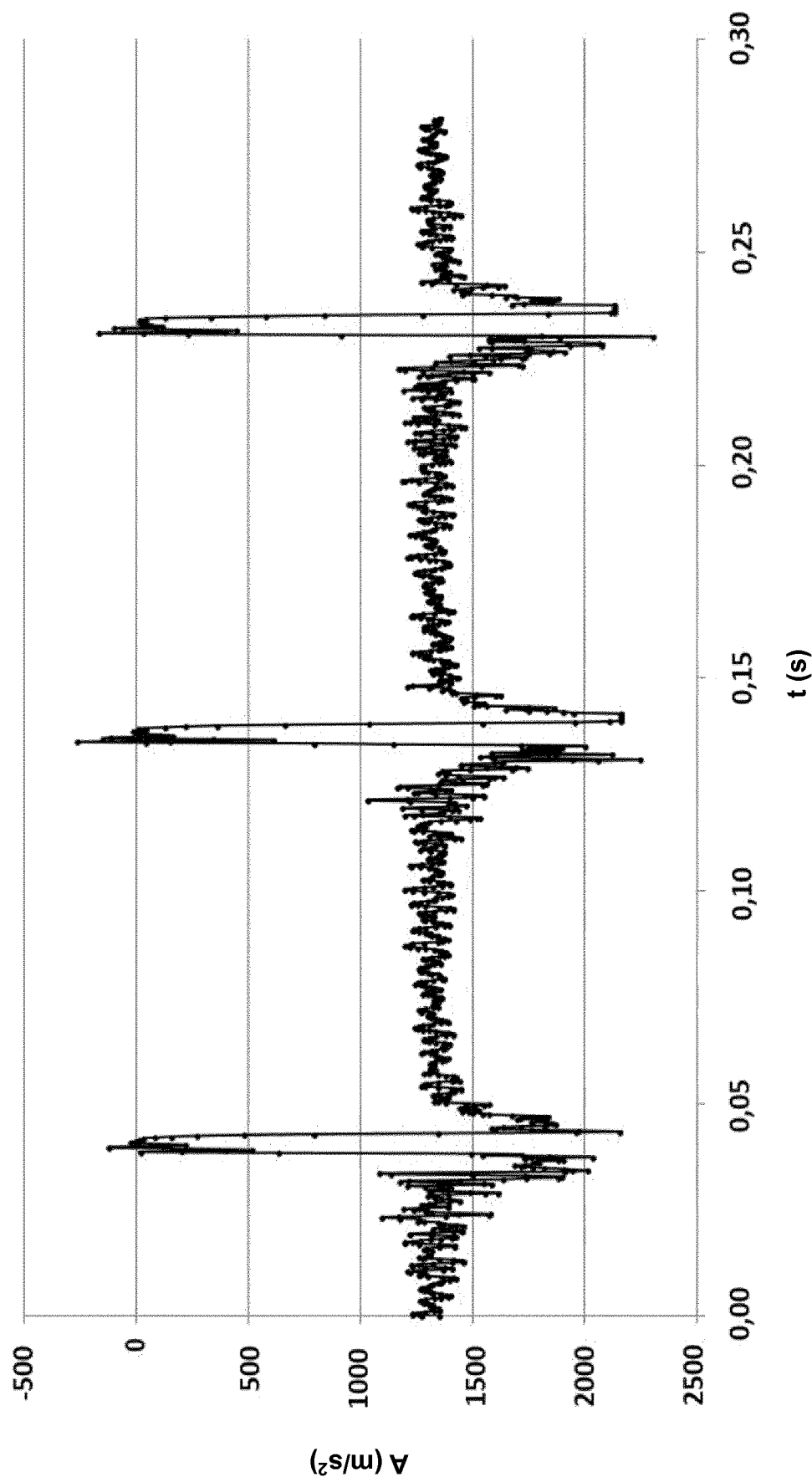
FIG. 1 shows a radial acceleration profile versus time for three consecutive tire round trips measured at 5 kHz sampling frequency.
Figure 2:
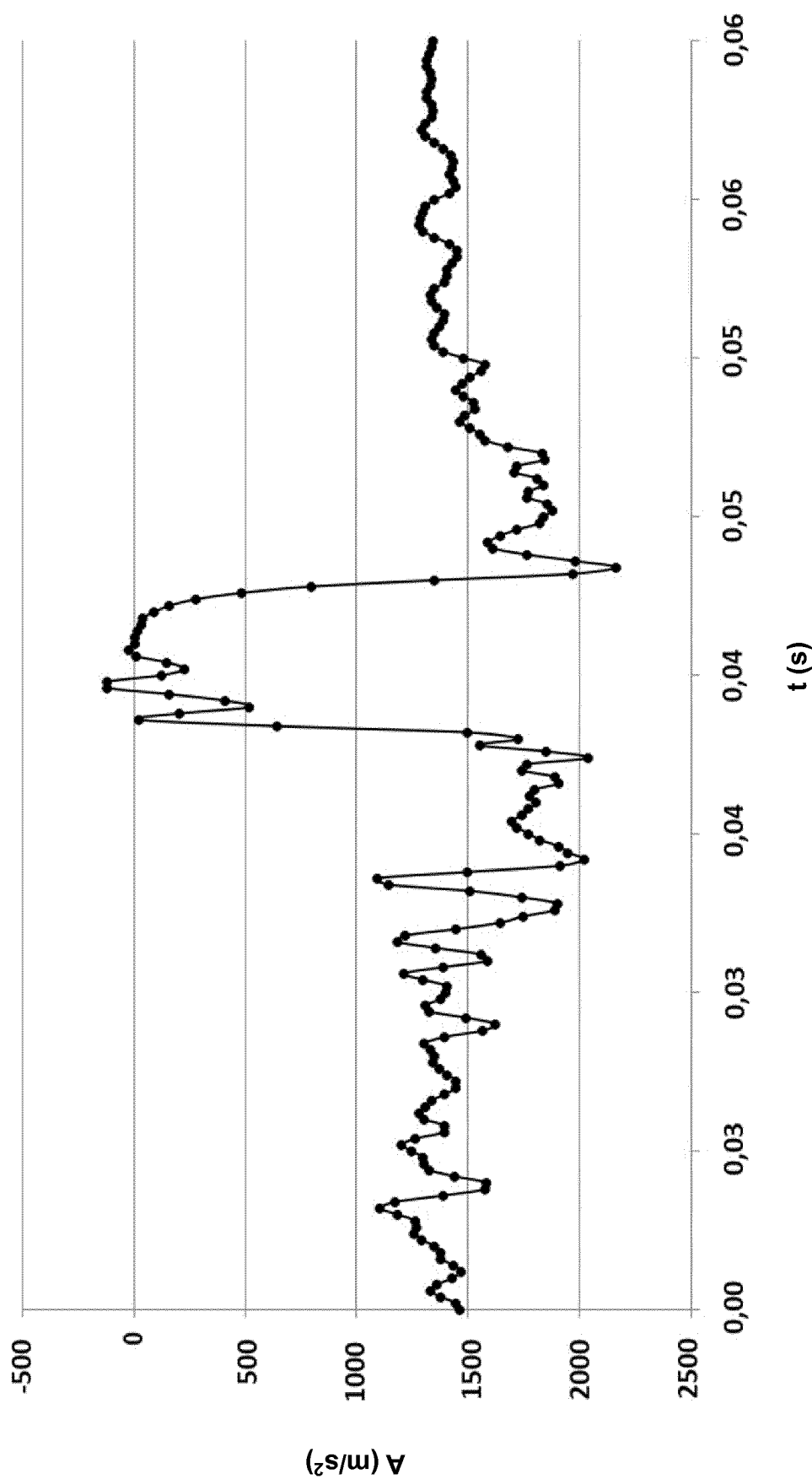
FIG. 2 shows a magnification of a detail of FIG. 1 around one peak in the acceleration profile of FIG. 1.
Figure 3:
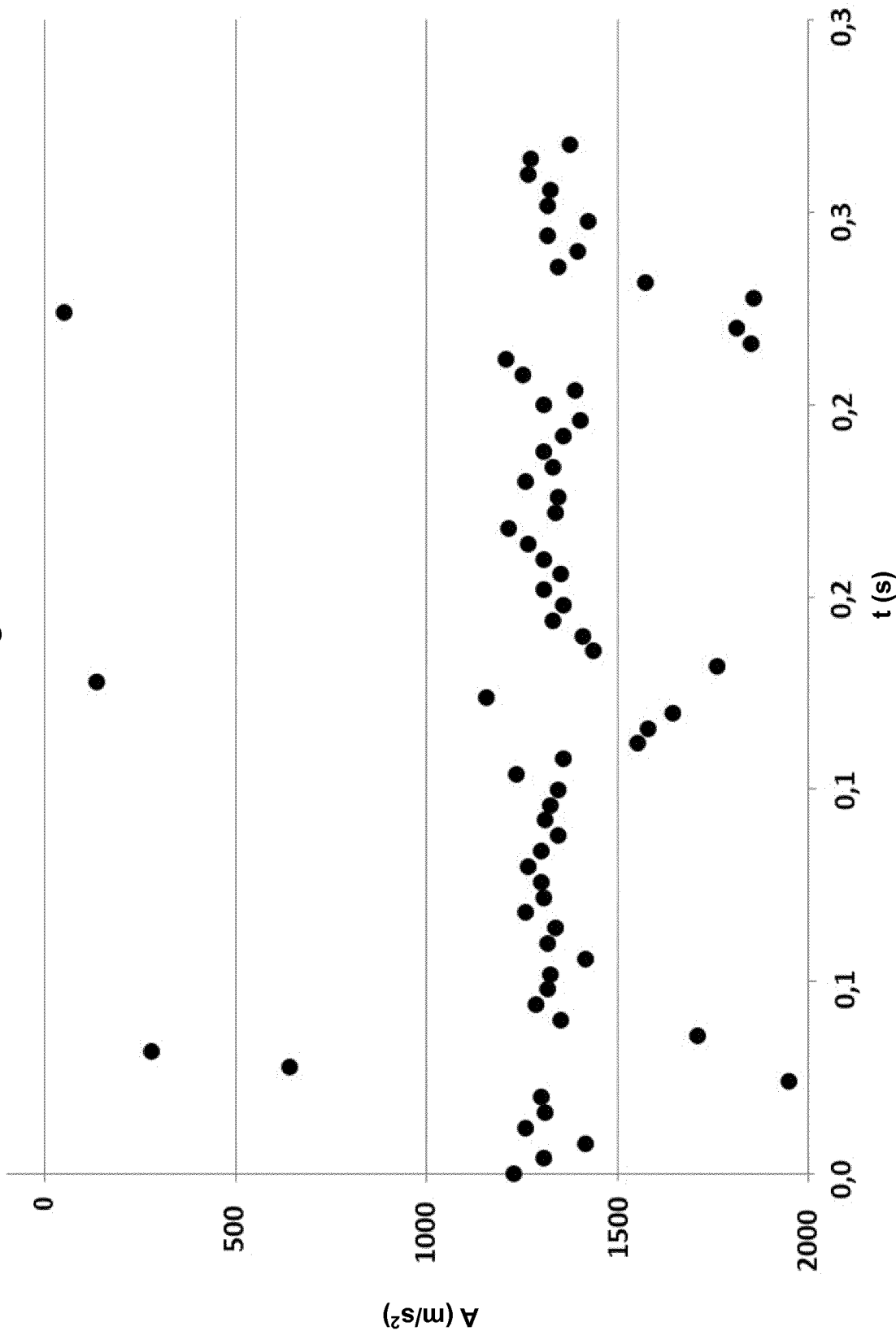
FIG. 3 shows radial acceleration versus time for three consecutive tire round trips measured at 250 Hz sampling frequency.
Figure 4:
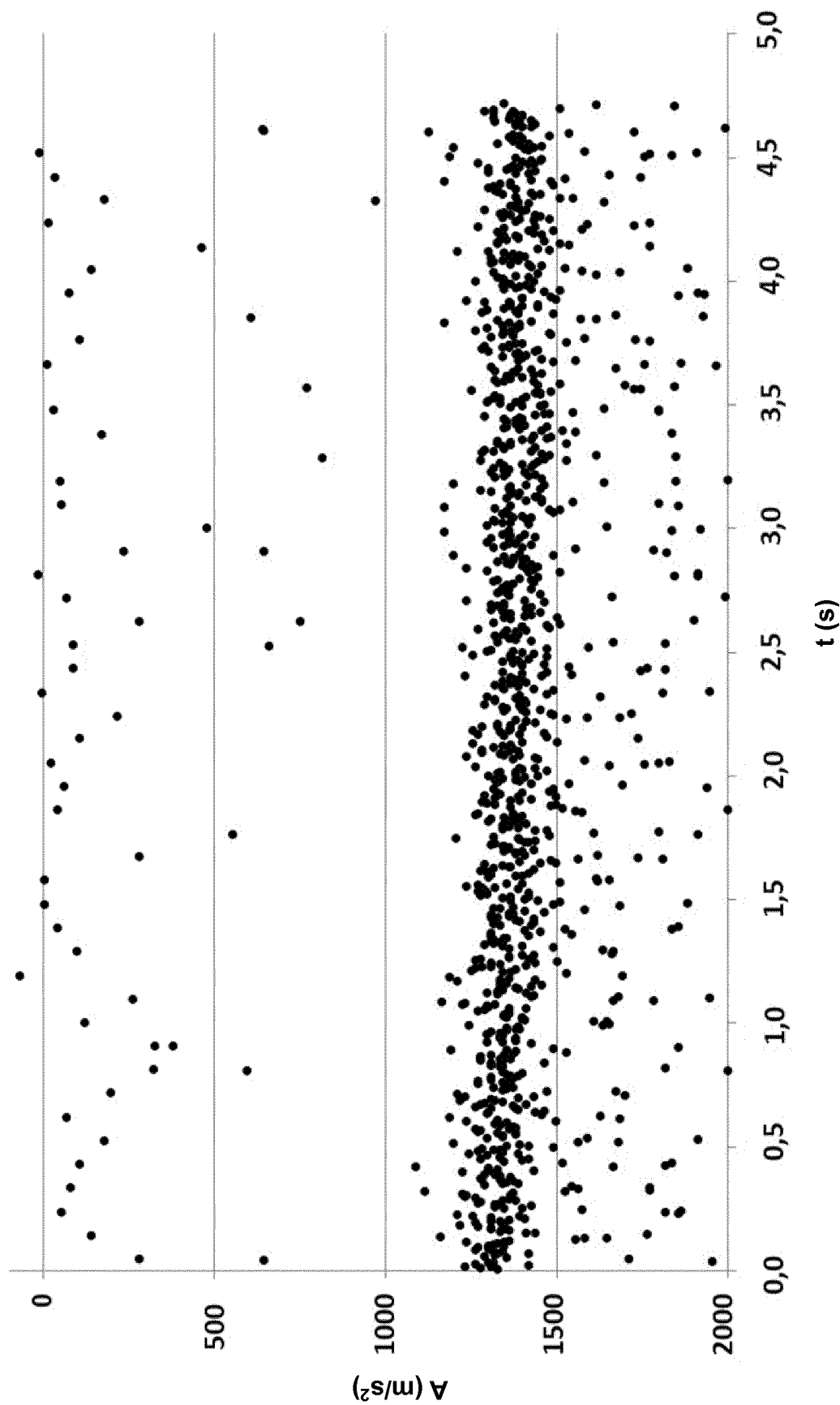
FIG. 4 shows radial acceleration versus time for a high number of consecutive tire round trips measured at 250 Hz sampling frequency.

This further sensor was a high frequency accelerometer operated at 5 KHz being able to reconstruct a precise acceleration signal as the one shown in FIG. 1, from which it is possible to determine the length of the contact area, to be used as a comparison with the outcome of the estimation performed via the low frequency operated monitoring units.

Figure 9:
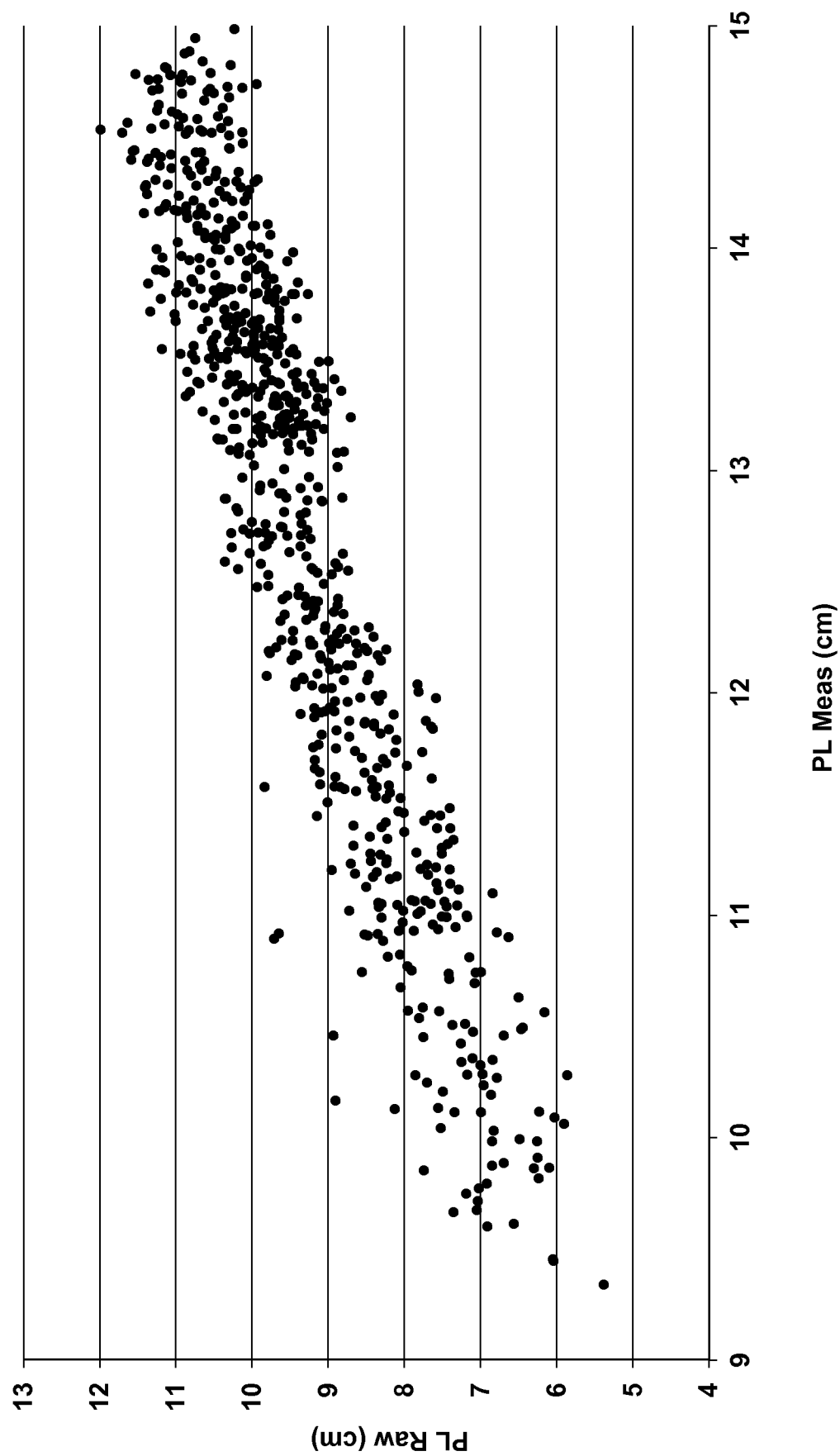
FIG. 9 shows a comparison between the measurement of the length of the contact area length obtained using a 5 kHz sensor (PLMeas) and a length of the contact area length obtained with a 250 Hz sensor (PLRaw) with the method according to an aspect of the present invention.

Reference is now made to FIG. 9 wherein it is shown a plot of the measurements of the contact area length obtained using the 5 KHz sensor (PLMeas) and the contact area length measured with the 250 Hz sensor (PLRaw).

The plot shows different values of the contact area length obtained by carrying out tests with different loads exerted on the tires, different inflation pressures of the tires, different vehicle speeds.

For each measured point, PLRaw has been calculated as the product of the tire circumference and the probability (p) of finding the monitoring unit (2) in correspondence of the contact area at a certain time during tire rolling. Said probability (p) has been estimated as the ratio of the first number of measurements and an overall number of measurements performed in an amount of time encompassing a high number of round trips, as explained above.

A clear, almost linear correlation between PLMeas and PLRaw is shown in FIG. 9. This means that the method of the invention is able to precisely estimate a quantity (PLraw) substantially proportional to the actual length of the contact area. Should the length of the contact area be the tire related parameter to be estimated, the quantity PLraw could be calculated and then used in a calibration formula stored, e.g. in the memory of the monitoring unit or the controlling unit, for obtaining the actual length of the contact area.

The tire monitoring method and system of the invention have been further tested in a second example by using a Porsche Macan equipped with a Pirelli tire model PZERO 265145R20 for the front axle and a PZERO 295140R20 for the rear axle.

All the four tires of said car have been fitted with monitoring units (2) according to the scheme illustrated in FIG. 5 and FIG. 6. The monitoring units included a tire pressure monitoring sensing unit model FXTH87, produced by NXP Semiconductors, operating at a sampling frequency of 250 Hz and comprising a two axis accelerometer. The monitoring units were installed into the tires so as to align one of the two axis with the radial direction.

A controlling unit communicating via Bluetooth with the monitoring units has been installed within the car. The controlling unit estimated the length of the contact area and the load exerted on the tires based on the measurements performed by the monitoring units. The car has also been equipped with dynamometric hubs in the right wheel of both front and rear axle, so as to have a reference comparison for the load estimation.

In this case the quantity PLraw has also been used in the estimation of the load exerted on the tire, by using PLraw in place of PL in the formulas 1, 2, 3 or 4) previously discussed, wherein the coefficients of the polynomial function have been suitably calibrated for the tire models used in the test.

Figure 10A:
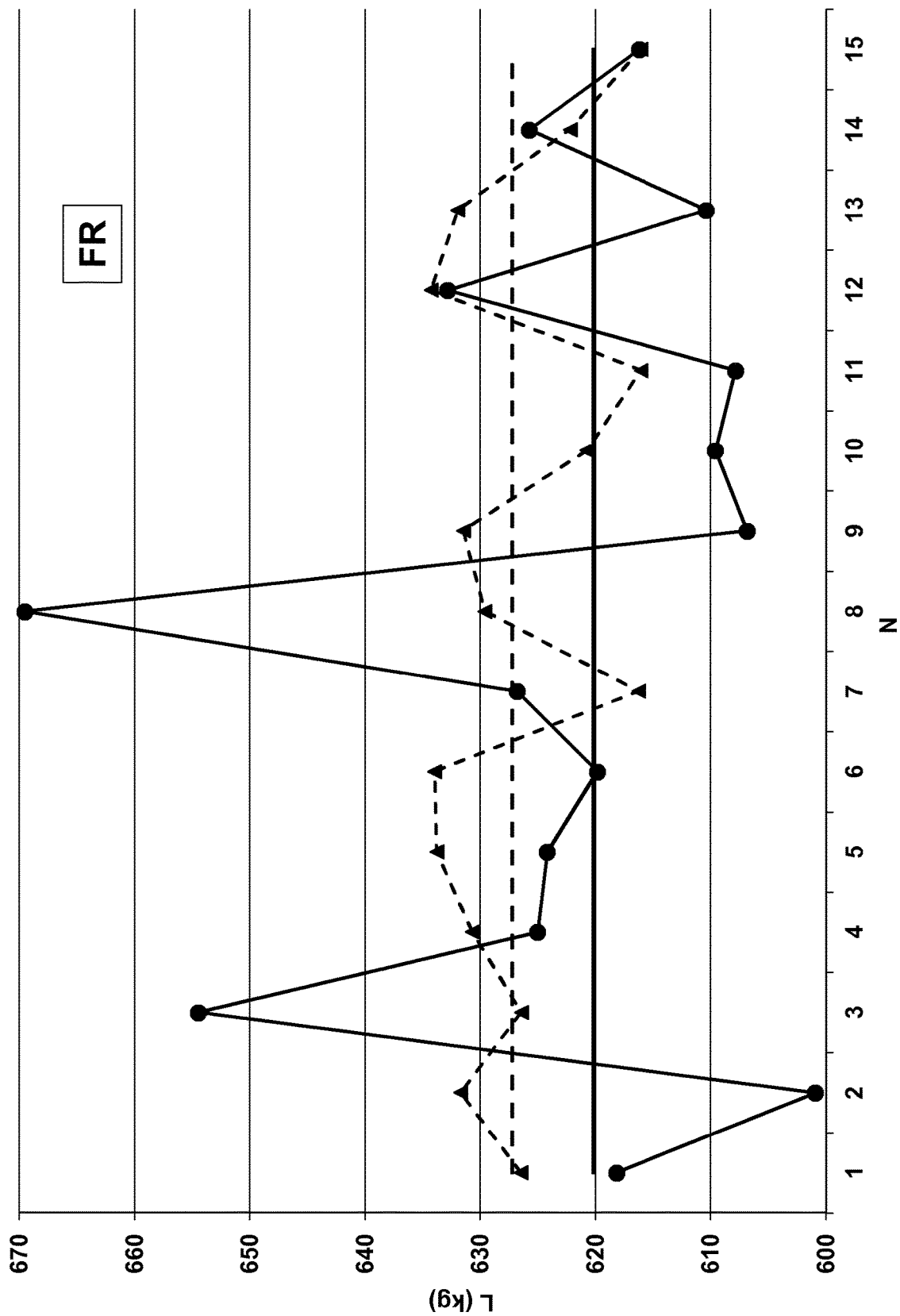
FIG. 10A shows a comparison of the load estimated by the method according to an aspect of the present invention and the direct reference measurement carried out with dynamometric hubs for the right wheel of the front axle (FR) of a vehicle.
Figure 10B:
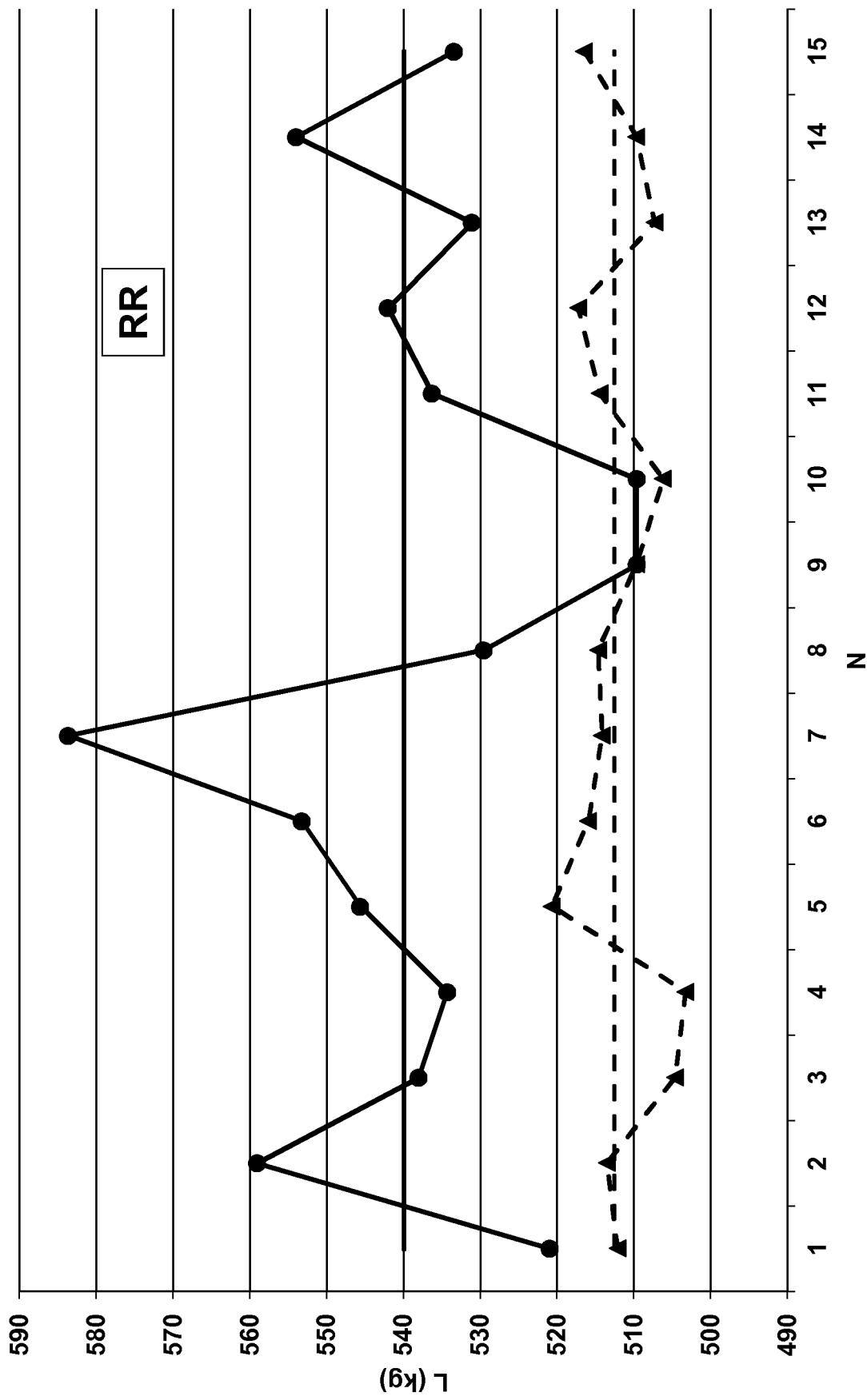
FIG. 10B shows a comparison of the load estimated by the method according to an aspect of the present invention and the direct reference measurement carried out with dynamometric hubs for the right wheel of the rear axle (RR) of a vehicle.

Reference is made to FIG. 10A and FIG. 10B, showing a comparison of the load estimated by the method of the present invention and the direct reference measurement carried out with the dynamometric hubs.

In particular, FIG. 10 A reports the comparison for the right wheel of the front axle (FR), while FIG. 10 B reports the comparison for the right wheel of the rear axle (RR).

Each circle in FIGS. 10A and 10B represents the load estimation based on the method of this invention using a respective measurement carried out in 10 seconds at a frequency of 250 Hz, i.e using an overall number of 2500 sampling points.

Each measurement is compared with a measurement carried out by using the dynamometric hub in the same 10 seconds time frame: these measurements are represented by triangles in FIG. 10 A and FIG. 10 B.

Load measurements have been repeated fifteen times with both methods.

A general agreement is found between the outcome of the method of the present invention and the reference one based on the dynamometric hubs.

In order to further increase the accuracy of the method of the present invention an average load value over the 15 measurements has been calculated. This is shown in FIGS. 10A and 10B respectively by the continuous horizontal line for the method of the present invention and by the dashed horizontal line for the dynamometric hub reference method.

For the right wheel of front axle an average value of 627 kg is estimated by the method of the present invention to be compared with an average value of 620 kg obtained with the reference method exploiting the dynamometric hubs.

For the right wheel of rear axle an average value of 540 kg is estimated by the method of the present invention to be compared with an average value of 513 kg obtained with the reference method exploiting the dynamometric hubs.

In both cases a very good agreement is found between the load values obtained by the method of the present invention with the one obtained by using the dynamometric hubs, the discrepancy being of the order of (1.5-5) % of the measured load value.

It is believed that the good agreement obtained between the load values could depend on the fact that the statistic approach explained above leads to an estimation of a length of the contact area PLraw exhibiting a consistent link to the actual length of the contact area PLmeas, which could be approximated, for example, by a linear relation.

The invention claimed is:

1. A method for monitoring a tire of a vehicle, the method comprising:
  a) securing a monitoring unit to a crown portion of the tire, wherein the monitoring unit comprises at least one first sensing element comprising an accelerometer and/or other inertial sensor adapted to measure at least one quantity descriptive of deformations of the tire, wherein the at least one quantity includes a radial acceleration of the crown portion during rotation of the tire;
  b) fitting the tire to a wheel of the vehicle and operating the vehicle to cause rotation of the tire on a rolling surface, wherein, due to the fitting and operating, the tire is deformed to form a contact area between the tire and the rolling surface;
  c) during the rotation of the tire, measuring the at least one quantity within an amount of time at a low sampling frequency ranging from 50 Hz to 1.5 kHz, so as to obtain an undersampled profile of the at least one quantity;
  d) for each measurement of the at least one quantity performed in c), determining whether a measured value of the at least one quantity is representative of a passage of said crown portion of the tire in correspondence with the contact area, to obtain a first number of passages of the crown portion of the tire in correspondence with the contact area within the amount of time;
  e) estimating a probability by determining a ratio between the first number of passages in said amount of time and an overall number of measurements within said amount of time at said low sampling frequency;
  f) estimating at least one parameter related to the tire based on the probability, wherein the at least one parameter related to the tire includes a length of the contact area during rotation; and
  g) performing the monitoring of the tire based on the at least one parameter estimated.

2. The method according to claim 1, wherein the low sampling frequency is lower than 750 Hz.

3. The method according to claim 1, wherein the low sampling frequency ranges from 150 Hz to 600 Hz.

4. The method according to claim 1, wherein the low sampling frequency is chosen in order to obtain, for a vehicle speed up to 100 km/h, an average number of measured values of the at least one quantity that are representative of the passage of the monitoring unit in correspondence with the contact area of at least 0.5 measurements per tire round trip.

5. The method according to claim 1, wherein the measurement of the at least one quantity is performed to obtain a sequence of measured values of the at least one quantity, the method further comprising extracting from the sequence a set of measured values that are representative of passages of said crown portion of the tire in correspondence with the contact area to obtain the first number of passages.

6. The method according to claim 1, further comprising:
h) interrupting the measurement of the at least one quantity after at least one occurrence of a measured value of the at least one quantity that is representative of the passage of said crown portion of the tire in correspondence with the contact area; and
i) starting again the measurement of the at least one quantity after a switch off time;
wherein the estimating at least one parameter comprises calculating a second number of virtual measurements based on the low sampling frequency and the switch off time.

7. The method according to claim 1, wherein the determination of whether the measured value of the at least one quantity is representative of the passage of said crown portion of the tire in correspondence with the contact area is performed by defining a threshold value and comparing the measured value of the at least one quantity with the threshold value.

8. The method according to claim 7, wherein the measurement of the at least one quantity is performed to obtain a sequence of measured values of the at least one quantity, the method further comprising extracting from the sequence a set of measured values that are representative of passages of said crown portion of the tire in correspondence with the contact area to obtain the first number of passages, and wherein the extraction of the set of measured values from the sequence of measured values is performed by selecting measured values of the sequence based on a comparison with the threshold value.

9. The method according to claim 7, further comprising setting an initial value of the threshold before starting the measurement of the at least one quantity, and adjusting the threshold value in response to variations of a rotation speed of the tire.

10. The method according to claim 1, wherein the monitoring unit comprises at least one second sensing element comprising a pressure sensor adapted to measure a tire pressure and/or a temperature sensor adapted to measure a tire temperature.

11. The method according to claim 1, wherein the at least one parameter related to the tire is a load exerted on the tire by the vehicle.

12. The method according to claim 1, wherein the monitoring unit comprises at least one second sensing element comprising a pressure sensor adapted to measure a tire pressure, and a load exerted on the tire by the vehicle is estimated based on the length of the contact area during rotation and the tire pressure.

13. The method according to claim 1, further comprising starting the measurement of the at least one quantity when at least one of the following access conditions is met: a speed of the vehicle is comprised within a predetermined speed range, and/or an absolute value of longitudinal acceleration of the vehicle is lower than a predetermined amount.

14. The method according to claim 1, further comprising stopping the measurement of the at least one quantity when at least one of the following stopping conditions is met: an absolute value of longitudinal acceleration of the vehicle exceeds a predetermined acceleration threshold, a speed of the vehicle is outside a predetermined speed range, and/or the amount of time exceeds a predetermined maximum amount of time.

15. The method according to claim 14, wherein the measurement of the at least one quantity is stopped when the amount of time exceeds the predetermined maximum amount of time and the predetermined maximum amount of time ranges from 10 seconds to 20 seconds.

16. The method according to claim 7, further comprising setting an initial value of the threshold before starting the measurement of the at least one quantity, and wherein the set initial value of the threshold value is based on a rotation speed of the tire and the radius of the tire.

17. A method for monitoring a tire of a vehicle, the method comprising:
a) associating a monitoring unit with the tire, wherein the monitoring unit comprises at least one first sensing element comprising an accelerometer and/or other inertial sensor adapted to measure at least one quantity descriptive of deformations of the tire, wherein the monitoring unit is secured to a crown portion of the tire, and the at least one first sensing element is adapted to measure at least a radial acceleration of the crown portion during rotation of the tire;
b) fitting the tire to a wheel of the vehicle and operating the vehicle to cause rotation of the tire on a rolling surface, wherein, due to the fitting and operating, the tire is deformed to form a contact area between the tire and the rolling surface;
c) during the rotation of the tire, measuring the at least one quantity within an amount of time at a low sampling frequency ranging from 50 Hz to 1.5 kHz, so as to obtain an undersampled profile of the at least one quantity;
d) for each measurement of the at least one quantity performed in c), determining whether a measured value of the at least one quantity is representative of a passage of the crown portion of the tire to which the monitoring unit is secured in correspondence with the contact area, to obtain a first number of passages of the crown portion of the tire to which the monitoring unit is secured in correspondence with the contact area within the amount of time;
e) estimating a probability by determining a ratio between the first number of passages in said amount of time and an overall number of measurements within said amount of time at said low sampling frequency;
f) estimating at least one parameter related to the tire based on the probability, wherein the at least one parameter related to the tire includes a length of the contact area during rotation; and
g) performing the monitoring of the tire based on the at least one parameter estimated.

* * * * *